United States Patent
Wada et al.

(10) Patent No.: US 9,461,884 B2
(45) Date of Patent: Oct. 4, 2016

(54) INFORMATION MANAGEMENT DEVICE AND COMPUTER-READABLE MEDIUM RECORDED THEREIN INFORMATION MANAGEMENT PROGRAM

(75) Inventors: Yuji Wada, Kawasaki (JP); Yasuhide Matsumoto, Kawasaki (JP); Masazumi Matsubara, Kawasaki (JP); Hiroshi Otsuka, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 945 days.

(21) Appl. No.: 13/236,067

(22) Filed: Sep. 19, 2011

(65) Prior Publication Data

US 2012/0011172 A1    Jan. 12, 2012

Related U.S. Application Data

(63) Continuation of application No. PCT/JP2009/056581, filed on Mar. 30, 2009.

(51) Int. Cl.
*G06F 17/30* (2006.01)
*H04L 12/24* (2006.01)

(52) U.S. Cl.
CPC ........... *H04L 41/085* (2013.01); *H04L 41/022* (2013.01)

(58) Field of Classification Search
CPC .................. G06F 17/30867; G06F 17/30392; G06F 17/3056; G06F 11/1032; G06F 11/3476
USPC ......................................................... 707/812
See application file for complete search history.

(56) References Cited

U.S. PATENT DOCUMENTS

| | | | | |
|---|---|---|---|---|
| 2,009 A | * | 3/1841 | Goell | 86/20.11 |
| 5,752,020 A | * | 5/1998 | Ando | G06F 17/30011 |
| 6,006,251 A | * | 12/1999 | Toyouchi | G06Q 30/06 |
| | | | | 707/E17.119 |
| 2002/0157116 A1 | * | 10/2002 | Jasinschi | G06F 17/30784 |
| | | | | 725/136 |
| 2006/0129415 A1 | * | 6/2006 | Thukral | G06Q 10/087 |
| | | | | 705/28 |

(Continued)

FOREIGN PATENT DOCUMENTS

| | | |
|---|---|---|
| JP | 7-192053 | 7/1995 |
| JP | 07192053 A  * | 7/1995 |

(Continued)

OTHER PUBLICATIONS

International Search Report for PCT/JP2009/056581 mailed Apr. 28, 2009.

*Primary Examiner* — Mohammad S Rostami
*Assistant Examiner* — Ahmed Abraham
(74) *Attorney, Agent, or Firm* — Staas & Halsey LLP

(57) ABSTRACT

An object is to integrate pieces of information related to mutually the same target, though the pieces of information do not contain, in common, an attribute unique to one target. To achieve the object, from a generated condition storage unit storing generated integration conditions each specifying one or more attributes contained, in duplicate, in pieces of information related to mutually the same target, one of the generated integration conditions specifying one or more attributes being the same as one or more attributes contained in integration target information is obtained as a generated integration condition corresponding to the integration target information. A CI $200b$ containing the attributes specified by the obtained generated integration condition and in which the values of the attributes specified are identical to the values of the attributes contained is determined as a CI related to the same target as the integration target information is related to.

6 Claims, 17 Drawing Sheets

(56) References Cited

U.S. PATENT DOCUMENTS

| | | | |
|---|---|---|---|
| 2006/0178954 A1* | 8/2006 | Thukral | G06Q 10/087 705/28 |
| 2006/0195297 A1* | 8/2006 | Kubota | G06F 17/30861 702/187 |
| 2006/0294152 A1* | 12/2006 | Kawabe | G06F 17/30011 |
| 2007/0250184 A1* | 10/2007 | Arita | G05B 13/024 700/28 |
| 2009/0147995 A1* | 6/2009 | Sawada | G06K 9/6289 382/103 |
| 2010/0153783 A1* | 6/2010 | Yokoyama | G06F 17/30864 714/37 |
| 2010/0198874 A1* | 8/2010 | Futatsugi | G06F 17/30176 707/784 |
| 2012/0011172 A1* | 1/2012 | Wada et al. | 707/812 |

FOREIGN PATENT DOCUMENTS

| | | | |
|---|---|---|---|
| JP | 2004-078336 | | 3/2004 |
| JP | 2004078336 A | * | 3/2004 |
| JP | 2006-018607 | | 1/2006 |
| JP | 2006-236280 | | 9/2006 |
| JP | 2006236280 A | * | 9/2006 |
| JP | 2010176574 A | * | 8/2010 |

* cited by examiner

FIG.1A

RECONCILIATION CONDITIONS

| IP ADDRESS |
|---|
| HOST NAME, DOMAIN NAME |
| HOST NAME |
| ASSET REGISTER NUMBER |
| ... |

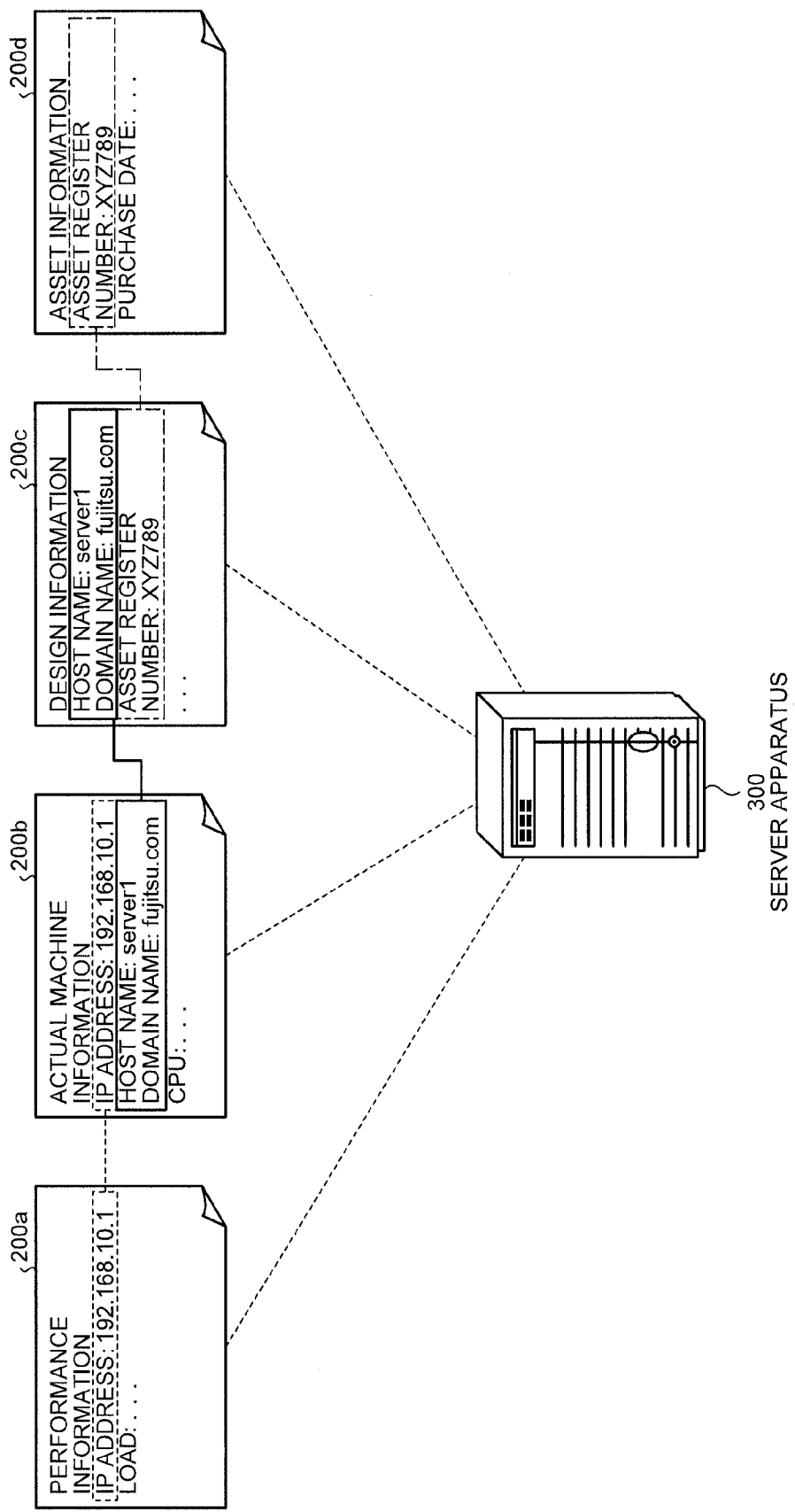

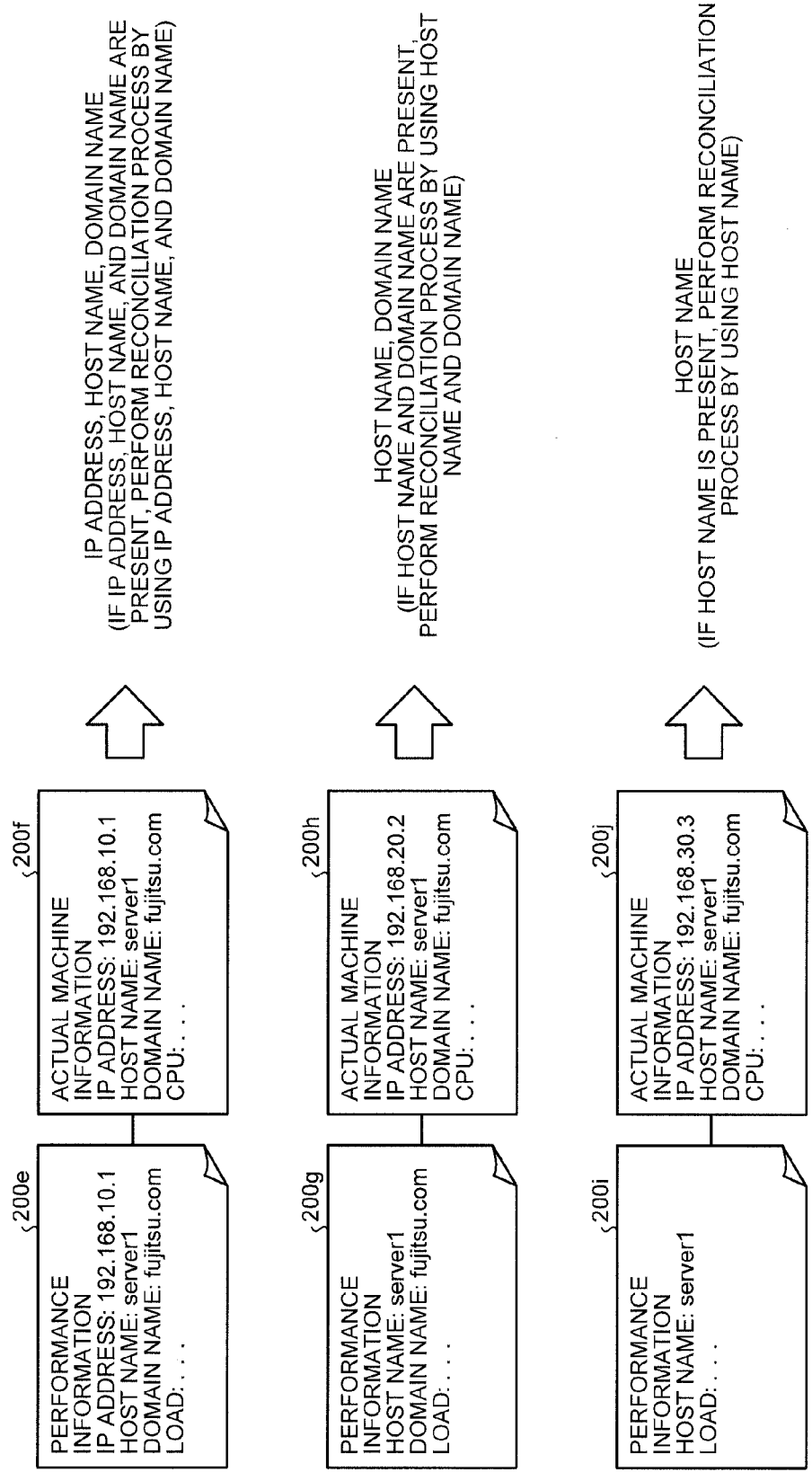

| EXISTING RECONCILIATION CONDITIONS ||| 
|---|---|---|
| ID | CI TYPE | ATTRIBUTE LIST |
| id1_1 | SERVER | IP ADDRESS |
| id1_2 | ASSET | ASSET REGISTER NUMBER |
| ... | ... | ... |

| GENERATED RECONCILIATION CONDITIONS ||| 
|---|---|---|
| ID | SEQUENTIAL ORDER | ATTRIBUTE LIST |
| id2_1 | 1 | IP ADDRESS, HOST NAME, DOMAIN NAME |
| id2_2 | 2 | HOST NAME, DOMAIN NAME |
| id2_3 | 3 | HOST NAME |
| id2_4 | 4 | ASSET REGISTER NUMBER |
| ... | ... | ... |

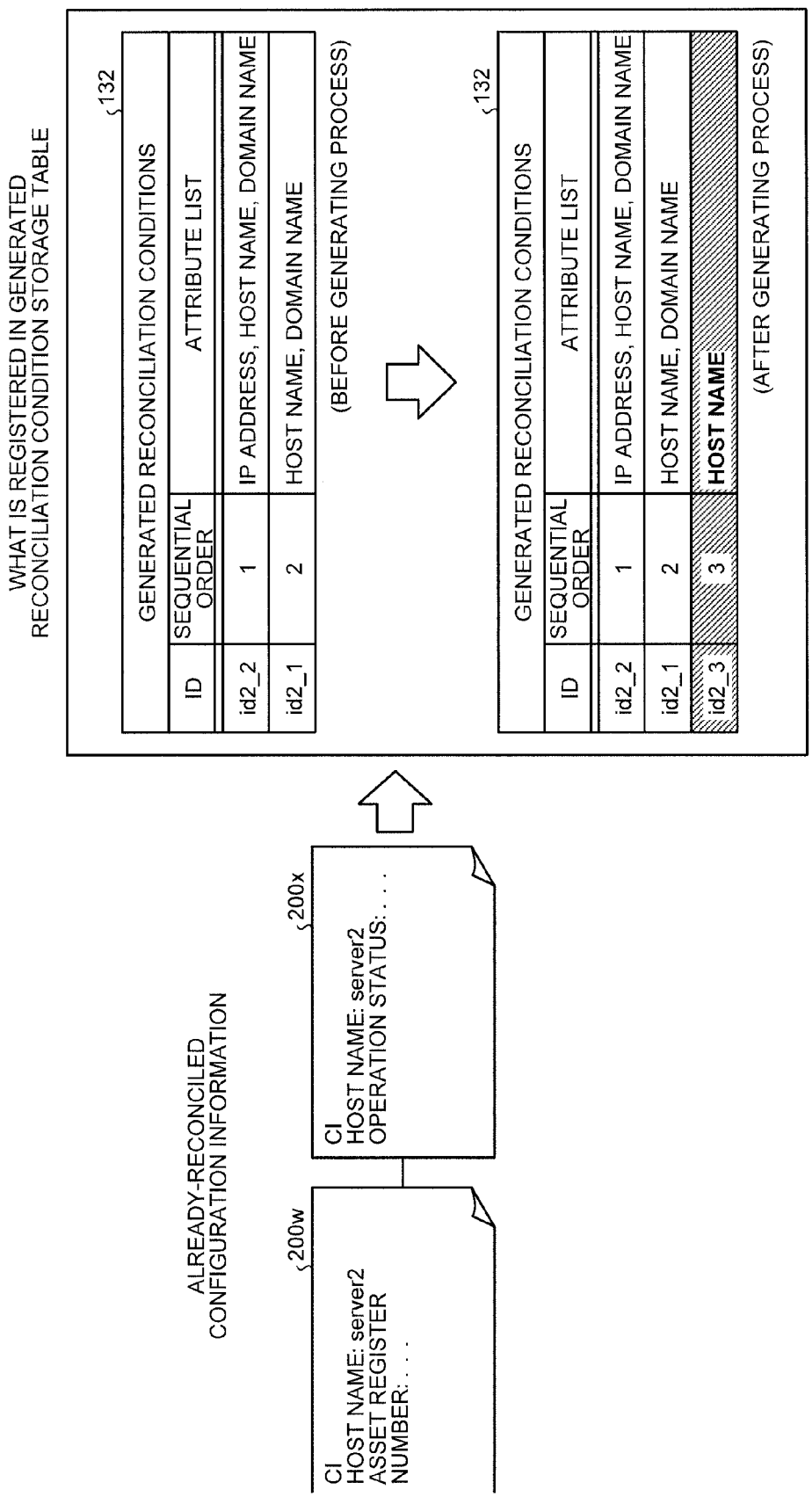

INFORMATION MANAGEMENT DEVICE AND COMPUTER-READABLE MEDIUM RECORDED THEREIN INFORMATION MANAGEMENT PROGRAM

CROSS-REFERENCE TO RELATED APPLICATION

This application is a continuation of International Application No. PCT/JP2009/056581, filed on Mar. 30, 2009, the entire contents of which are incorporated herein by reference.

FIELD

The present invention relates to an information management apparatus and an information management program.

BACKGROUND

In recent years, Information Technology (IT) systems have been developed so as to be open and compliant with multi vendors and have thus become large-scale and more complicated, being combined with an increasing number of servers and an expansion of storage capacities. As a result, huge problems have arisen where not only the operation costs increase, but also the systems are frequently suspended due to human errors and the quality of service is often degraded. To solve these programs, it is important to manage configuration information of the IT systems such as information about servers, storages, and applications.

As an apparatus that manages the configuration information of an IT system, an information management apparatus including a database called a Configuration Management Database (CMDB) is known. The information management apparatus manages, as the configuration information, constituent elements called Configuration Items (CIs) such as devices, software, and data logs that constitute the IT system, as well as information (hereinafter, "relationship information") indicating a relationship among the CIs. Further, each of the CIs contains, as attributes (hereinafter, "properties") related to the CI, detailed information such as the type of the device, an IP address, a vendor name, a model name, and the like.

To operate a data center, pieces of operation management middleware optimized for different management tasks such as a sever management, a network management, a service management, and an asset management are used. Further, each of the pieces of operation management middleware has a unique CMDB and inputs configuration information related to the task thereof into the CMDB. Accordingly, because each of the CMDBs manages the configuration information independently of the other CMDBs, the methods for accessing the CMDBs and the data formats of the configuration information managed by the CMDBs may vary among the different CMDBs. Consequently, the reality is that using the CMDBs in collaboration with one another cannot help but involve human labor.

To cope with this situation, an information management apparatus including a database called Federated Configuration Management Database (FCMDB) that virtually integrates various type of configuration information distributed in a plurality of CMDBs has been developed. The CMDBs virtually integrated by the FCMDB may be referred to as Management Data Repositories (MDRs).

For example, as depicted in FIG. 14, MDRs 800a to 800f are connected to an information management apparatus 700 via a network such as the Internet. The MDR 800a manages information about configurations of the devices and the like that are present in the IT system. The MDR 800b manages incident history information in the IT system. The MDR 800c manages information about troubles that occurred in the IT system. The MDR 800d manages release information about services and the like provided in the IT system. The MDR 800e manages change information about the devices and the like in the IT system. The MDR 800f manages information about applications installed in the devices and the like in the IT system.

At predetermined timing, each of the MDRs 800a to 800f transmits the configuration information managed thereby to the information management apparatus 700. When the information management apparatus 700 has obtained the configuration information from the MDRs 800a to 800f, the information management apparatus 700 manages the obtained configuration information, by integrating the configuration information for each of different targets. In this situation, the information management apparatus 700 has a reconciliation function to arbitrate between the pieces of configuration information managed by the MDRs 800a to 800f. More specifically, the reconciliation function is a function to integrate pieces of configuration information that are related to mutually the same target and are managed in two or more of the MDRs 800a to 800f under mutually different names or mutually different IDs.

For example, let us assume that pieces of configuration information about mutually the same target 900 (e.g., a server apparatus) are managed while being distributed in the MDRs 800a, 800c, 800e, and 800f among the MDRs 800a to 800f. More specifically, as configuration information 850a of mutually the same target 900, the MDR 800a manages properties such as a name "server", an ID "WebServer1", an IP address "192.168.10.1", and the CPU of mutually the same target 900. As configuration information 850b of mutually the same target 900, the MDR 800c manages properties such as the name "server", an ID "192.168.10.1", the IP address "192.168.10.1", and a status of mutually the same target 900.

Further, as configuration information 850c of mutually the same target 900, the MDR 800e manages properties such as a name "host", an ID "hostnameX", and the IP address "192.168.10.1" of mutually the same target 900. Also, as configuration information 850d of mutually the same target 900, the MDR 800f manages properties such as a name "node", the ID "192.168.10.1", the IP address "192.168.10.1", and an application of mutually the same target 900. As explained here, the MDRs 800a, 800c, 800e, and 800f manage the pieces of configuration information related to mutually the same target 900 under the mutually different names and the mutually different IDs.

Exercising the reconciliation function, the information management apparatus 700 integrates the pieces of configuration information 850a to 850d together as configuration information related to mutually the same target 900, by performing a collating process on the pieces of configuration information 850a to 850d while using a property that is unique to mutually the same target 900. For example, among the various types of properties contained in the pieces of configuration information 850a to 850d, the information management apparatus 700 performs the collating process by using the IP address, which is a property unique to mutually the same target 900. In other words, from among the pieces of configuration information obtained from the MDRs 800a to 800f, the information management apparatus 700 identifies the pieces of configuration information 850a,

850b, 850c, and 850d each of which contains mutually the same IP address "192.168.10.1" as a property. Further, the information management apparatus 700 integrates the pieces of configuration information 850a, 850b, 850c, and 850d together as configuration information related to mutually the same target 900 to which the IP address "192.168.10.1" is assigned.

As explained above, the information management apparatus 700 integrates and manages the pieces of configuration information 850a to 850d that are related to mutually the same target 900 and are managed while being distributed in the plurality of MDRs 800a to 800f. As a result, by referring to the configuration information virtually integrated by the information management apparatus 700, an operator such as a system administrator is able to easily understand the configuration of the entire IT system, in many different situations of the system operation such as a patch application task, a hardware maintenance task, and the like. Hereinafter, integrating a piece of configuration information with another piece of configuration information related to the same target 900 as the piece of configuration information is related to may be referred to as a reconciliation process.

Patent Document 1: Japanese Laid-open Patent Publication No. 2006-18607.

It is, however, difficult for the conventional information management apparatus to perform the reconciliation process on the pieces of configuration information when, although the pieces of configuration are related to mutually the same target, the pieces of configuration information contain no collation-purpose property, i.e., when the pieces of configuration information do not contain, in common, a property unique to one target. For example, let us assume that, as depicted in FIG. 15, pieces of configuration information related to mutually the same target 900 are managed while being distributed in MDRs 800g to 800i. More specifically, the MDR 800g manages, as configuration information 850g of mutually the same target 900, properties such as the name "server", the IP address "192.168.10.1", and the CPU of mutually the same target 900. Further, the MDR 800h manages, as configuration information 850h of mutually the same target 900, properties such as the name "server", the IP address "192.168.10.1", and the load of mutually the same target 900. Also, the MDR 800i manages, as configuration information 850i of mutually the same target 900, properties such as a name "asset" and an asset register number "ABC1234" of mutually the same target 900.

In this situation, the information management apparatus 700 reconciles the configuration information 850g and the configuration information 850h as configuration information related to mutually the same target 900, by using the IP address "192.168.10.1", which is a property unique to mutually the same target, as a collation-purpose property. The configuration information 850i, however, does not contain the "IP address", although the configuration information 850i contains the "asset register number" as a property unique to mutually the same target 900. Accordingly, the information management apparatus 700 is not able to reconcile the configuration information 850i with the configuration information 850g or with the configuration information 850h. Similarly, when using the asset register number "ABC1234" as a collation-purpose property, the information management apparatus 700 is not able to reconcile the configuration information 850i with the configuration information 850g or with the configuration information 850h.

In this situation, for example, it has been known to use a reconciliation condition that causes the operator to manually perform a reconciliation process by displaying a plurality of pieces of configuration information that do not contain, in common, a collation-purpose property on a display monitor for the operator and prompting the operator to judge whether these pieces of configuration information are related to mutually the same target. Such a reconciliation condition, however, is not practical because a large burden is laid on the operator, and also, a certain level of skill is required to perform the reconciliation process.

SUMMARY

According to an embodiment of the invention, an information management apparatus includes a generated condition storage unit that stores therein generated integration conditions each specifying one or more attributes contained, in duplicate, in a plurality of pieces of information related to a mutually same target, a condition obtaining unit that obtains, from the generated condition storage unit, one of the generated integration conditions specifying only one or more attributes that are same as one or more attributes contained in integration target information that is information representing a target to be integrated, as an integration condition corresponding to the integration target information, and a same target information judging unit that determines information that contains the one or more attributes specified by the generated integration condition obtained by the condition obtaining unit and in which values of the one or more attributes specified by the generated integration condition from among one or more attributes contained in the information are identical to the values of the one or more attributes specified by the generated integration condition from among the one or more attributes contained in the integration target information, as information related to a same target as the integration target information is related to.

According to an embodiment of the invention, A non-transitory computer-readable storage medium that stores therein information management program causing a computer to perform a process includes obtaining, from a generated condition storage unit storing therein generated integration conditions each specifying one or more attributes contained, in duplicate, in a plurality of pieces of information related to a mutually same target, one of the generated integration conditions from the generated condition storage unit specifying only one or more attributes that are same as one or more attributes contained in integration target information that is information representing a target to be integrated, as an integration condition corresponding to the integration target information, and determining information that contains the one or more attributes specified by the generated integration condition obtained at the obtaining and in which values of the one or more attributes specified by the generated integration condition from among one or more attributes contained in the information are identical to the values of the one or more attributes specified by the generated integration condition from among the one or more attributes contained in the integration target information, as information related to a same target as the integration target information is related to.

BRIEF DESCRIPTION OF DRAWINGS

FIG. 1A is a drawing of examples of reconciliation conditions stored in an information management apparatus according to an embodiment;

FIG. 1B is a drawing for explaining an overview of a reconciliation process performed by the information management apparatus according to the present embodiment;

FIG. 2 is a drawing for explaining an overview of a reconciliation condition generating process performed by the information management apparatus according to the present embodiment;

FIG. 4 is a drawing of an example of an existing reconciliation condition storage table;

FIG. 5 is a drawing of an example of a generated reconciliation condition storage table;

FIG. 7B is another drawing for explaining the reconciliation condition generating process according to the present embodiment;

DESCRIPTION OF EMBODIMENT

Figure 3:
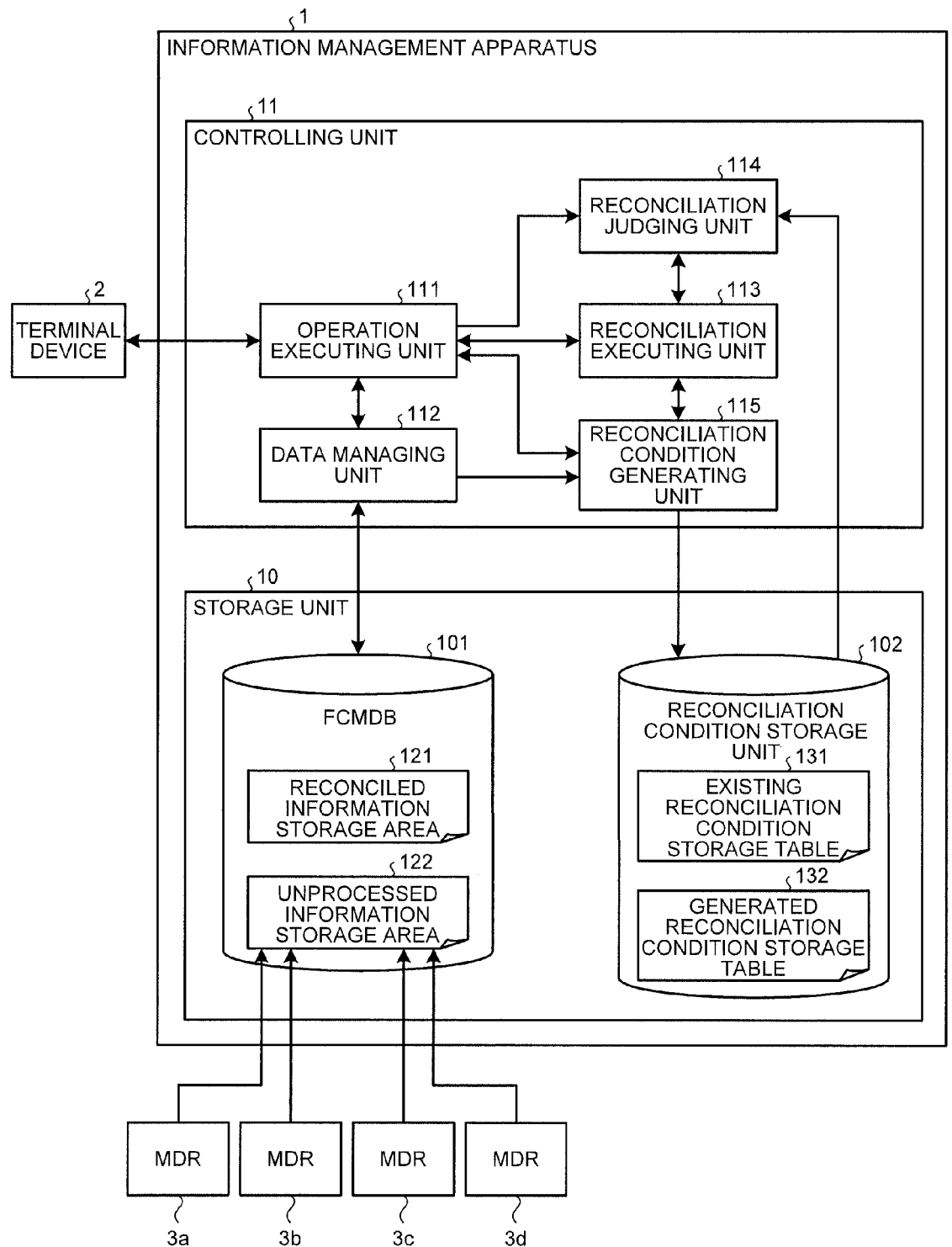
FIG. 3 is a block diagram of an information management apparatus according to the present embodiment.

In the following sections, exemplary embodiment of an information management apparatus and an information management computer program (hereinafter, "information management program") disclosed by the present patent application will be explained in detail, with reference to the accompanying drawings. The present invention is not limited by the exemplary embodiments. For example, the exemplary embodiments will be explained by using configuration information in an information processing system that is managed while being distributed in a plurality of Management Data Repositories (MDRs), as an example of information managed while being distributed in a plurality of storage devices. However, the technical features disclosed in the present patent application are not limited to this example. As another example, it is possible to apply the disclosed technical features to a situation where information about a plurality of bank accounts and credit cards owned by one person is managed while being distributed among a plurality of companies, and a situation where the information about the same person managed in the distributed manner is to be integrated.

An information management apparatus according to an exemplary embodiment collects pieces of configuration information in an information processing system being a management target from a plurality of MDRs managing the pieces of configuration information in a distributed manner and manages the collected pieces of information by integrating pieces of configuration information related to mutually the same target. In this situation, the configuration information is information including CIs related to constituent elements of an IT system such as devices, software, and data logs and relationship information indicating a relationship among the CIs. Further, each of the CIs contains, as properties thereof that are attributes related to the CI, detailed information such as the type of the CI, an IP address, a vender name, a model name, and the like. The MDRs are devices that individually manage the configuration information.

First, an overview of the information management apparatus is explained. Hereinafter, to integrate pieces of configuration information related to mutually the same target is referred to as "reconciliation". FIG. 1A is a drawing of examples of reconciliation conditions stored in the information management apparatus according to the present embodiment. FIG. 1B is a drawing for explaining an overview of a reconciliation process performed by the information management apparatus according to the present embodiment.

The information management apparatus according to the present embodiment stores therein integration conditions (hereinafter, "reconciliation conditions") each specifying one or more of properties contained in CIs. For example, as depicted in FIG. 1A, the information management apparatus stores therein, as the reconciliation conditions, "IP address", "host name, domain name", "host name", and "asset register number". Further, the information management apparatus reconciles a piece of configuration information (hereinafter, "reconciliation target information") being a target of a reconciliation process with another piece of configuration information by using a reconciliation condition. In particular, the information management apparatus according to the present embodiment changes the reconciliation condition corresponding to the reconciliation target information, depending on how the attributes contained in the reconciliation target information match.

For example, let us assume that, as depicted in FIG. 1B, CIs 200a to 200d containing detailed information about a server apparatus 300 are managed in mutually different MDRs, respectively. More specifically, the CI 200a represents performance information of the server apparatus 300 and contains an IP address "192.168.10.1" and load information, as properties. The CI 200b represents actual machine information of the server apparatus 300 and contains the IP address "192.168.10.1", a domain name "fujitsu.com", a host name "server1", and CPU information, as properties. The CI 200c represents design information of the server apparatus 300 and contains the host name "server1" and an asset register number "XYZ789" as properties. The CI 200d represents asset information of the server apparatus 300 and contains the asset register number "XYZ789" and information about the date of purchase as properties.

In this situation, to reconcile the CI 200a with another CI, for example, because the CI 200a contains the IP address as a property, the information management apparatus performs a reconciliation process by using a reconciliation condition "IP address". More specifically, the information management apparatus identifies a CI containing the same IP address value as the IP address "192.168.10.1" contained in the CI 200a, as a CI related to the same target as the CI 200a is related to. Accordingly, it is possible to reconcile the CI 200a with the CI 200b containing the same IP address as the IP address contained in the CI 200a.

As another example, to reconcile the CI 200c with another CI, because the CI 200c contains the host name and the domain name as properties, the information management apparatus performs a reconciliation process by using reconciliation conditions "host name" and "domain name". More specifically, the information management apparatus identifies a CI containing the same host name value and the same domain name value as the host name "server1" and the domain name "fujitsu.com" contained in the CI 200c, as a CI related to the same target as the CI 200c is related to. Accordingly, it is possible to reconcile the CI 200c with the CI 200b containing the host name and the domain name that are the same as the host name and the domain name contained in the CI 200c.

As yet another example, to reconcile the CI 200d with another CI, because the CI 200d contains the asset register number as a property, the information management apparatus performs a reconciliation process by using a reconciliation condition "asset register number". More specifically, the information management apparatus identifies a CI containing the same asset register number value as the asset register number "XYZ789" contained in the CI 200d, as a CI related to the same target as the CI 200d is related to. Accordingly, it is possible to reconcile the CI 200d with the CI 200c containing the same asset register number as the asset register number contained in the CI 200d.

As explained above, the information management apparatus according to the present embodiment changes the reconciliation condition used in the reconciliation process, depending on how the properties contained in the CIs match one another. Thus, even if some of the CIs (e.g., the CI 200b and the CI 200c) do not contain, in common, a property unique to the server apparatus 300 such as the IP address or the asset register number thereof, it is possible to reconcile the CIs with each other.

Further, the information management apparatus according to the present embodiment generates the reconciliation conditions based on the properties contained in the plurality of CIs related to mutually the same target. In the following sections, an overview of the reconciliation condition generating process will be explained. FIG. 2 is a drawing for explaining the overview of the reconciliation condition generating process performed by the information management apparatus according to the present embodiment.

For example, let us assume that, as depicted in FIG. 2, a CI 200e and a CI 200f have already been reconciled. The CI 200e contains the IP address "192.168.10.1", the host name "server1", the domain name "fujitsu.com", and load information, as performance information. The CI 200f contains the IP address "192.168.10.1", the host name "server1", the domain name "fujitsu.com", and CPU information, as actual machine information. In this situation, the information management apparatus extracts the properties "IP address", "host name", and "domain name" that are contained in the CIs 200e and 200f in duplicate and of which the values are identical. Further, the information management apparatus registers a reconciliation condition specified by the extracted properties as a new reconciliation condition. It should be noted that, when CIs (e.g., the CI 200e and the CI 200f) are related to mutually the same target, the values of the properties that are contained in the CIs 200e and 200f in duplicate are identical to each other.

Similarly, let us assume that a CI 200g and a CI 200h have already been reconciled. The CI 200g contains the host name "server1", the domain name "fujitsu.com", and load information, as performance information. The CI 200h contains an IP address "192.168.20.2", the host name "server1", the domain name "fujitsu.com", and CPU information, as actual machine information. In this situation, the information management apparatus extracts the properties "host name" and "domain name" that are contained in the CIs 200g and 200h in duplicate and of which the values are identical. Further, the information management apparatus registers a reconciliation condition specified by the extracted properties as a new reconciliation condition.

Similarly, let us assume that a CI 200i and a CI 200j have already been reconciled. The CI 200i contains the host name "server1" and load information, as performance information. The CI 200j contains an IP address "192.168.30.3", the host name "server1", the domain name "fujitsu.com", and CPU information, as actual machine information. In this situation, the information management apparatus extracts the property "host name" that is contained in the CIs 200i and 200j in duplicate and of which the values are identical. Further, the information management apparatus registers a reconciliation condition specified by the extracted property as a new reconciliation condition.

Besides those CIs that have already been reconciled, this process may also be performed on CIs that have not yet been reconciled, but have been determined and specified by an operator such as a system administrator as CIs that are related to mutually the same target. By generating reconciliation conditions while using the CIs that have already been reconciled and the CIs determined by the operator as CIs of mutually the same target (i.e., CIs related to mutually the same target) in the manner described above, it is possible to generate reconciliation conditions having a high reliability, and it is therefore possible to perform a more flexible reconciliation judging process.

Next, a configuration of an information management apparatus according to the present embodiment is explained. FIG. 3 is a block diagram of the information management apparatus according to the present embodiment.

As depicted in FIG. 3, an information management apparatus 1 according to the present embodiment includes a storage unit 10 and a controlling unit 11. Further, the information management apparatus 1 is connected, via a network, to a terminal device 2 used by an operator such as a system administrator and to a plurality of MDRs 3a to 3d. The terminal device 2 may be configured with a computer dedicated for this use, a commonly-used personal computer, or the like. The MDRs 3a to 3d are devices that individually manage the configuration information of the information processing system being a management target.

The storage unit 10 stores therein data and programs that are necessary in various types of processes performed by the controlling unit 11. In particular, the storage unit 10 includes a Federated Configuration Management Database (FCMDB)

101 and a reconciliation condition storage unit 102. The FCMDB 101 is a database that virtually integrates and manages the configuration information distributed in the plurality of MDRs 3a to 3d. Because each of the MDRs 3a to 3d manages the configuration information independently of the others among the MDRs 3a to 3d, the methods for accessing the MDRs 3a to 3d and the data formats of the configuration information managed by the MDRs 3a to 3d may vary for each of the MDRs 3a to 3d.

The FCMDB 101 includes an already-reconciled information storage area (hereinafter, "reconciled information storage area") 121 and an unprocessed information storage area 122. The reconciled information storage area 121 is a storage area that stores therein, of the configuration information obtained from the MDRs 3a to 3d, configuration information that has been reconciled by a reconciliation executing unit 113 (explained later). In contrast, the unprocessed information storage area 122 is a storage area that stores therein, of the configuration information obtained from the MDRs 3a to 3d, configuration information on which the reconciliation process has not yet been performed by the reconciliation executing unit 113 (explained later). The configuration information collected from the MDRs 3a to 3d is first stored into the unprocessed information storage area 122.

The reconciliation condition storage unit 102 stores therein reconciliation conditions used in processes performed by the reconciliation executing unit 113 and a reconciliation judging unit 114 (explained later). The reconciliation condition storage unit 102 includes an existing reconciliation condition storage table 131 and a generated reconciliation condition storage table 132. The existing reconciliation condition storage table 131 stores therein reconciliation conditions that are registered in the information management apparatus 1 in advance. An example of the existing reconciliation condition storage table 131 is presented in FIG. 4.

As depicted in FIG. 4, the existing reconciliation condition storage table 131 stores therein CI types and attribute lists that are kept in correspondence with IDs, as existing integration conditions (hereinafter, "existing reconciliation conditions"). Each of the CI types indicates the type of the CI represented by reconciliation target information. Each of the attribute lists is represented by a property contained in the CI. In particular, from among the various types of properties contained in the CIs, only such properties of which the values are each unique to one target (e.g., the IP address, the asset register number) are specified in the attribute lists of the existing reconciliation condition storage table 131. Each of the IDs is an identification number used for identifying a different one of the existing reconciliation conditions.

For example, the existing reconciliation condition to which an ID "id1_1" is assigned indicates that, when the type of the CI represented by the reconciliation target information is "server", a reconciliation process will be performed by using the property "IP address". As another example, the existing reconciliation condition to which an ID "id1_2" is assigned indicates that, when the type of the CI represented by the reconciliation target information is "asset", a reconciliation process will be performed by using the property "asset register number".

As described above, the existing reconciliation condition storage table 131 corresponds to an existing condition storage unit that stores therein existing integration conditions each specifying only one or more attributes of which the values are unique to one target.

The generated reconciliation condition storage table 132 stores therein reconciliation conditions generated by a reconciliation condition generating unit 115 (explained later). An example of the generated reconciliation condition storage table 132 is presented in FIG. 5.

As depicted in FIG. 5, the generated reconciliation condition storage table 132 stores therein "sequential order" and "attributes lists" that are kept in correspondence with "IDs", as generated integration conditions (hereinafter, "generated reconciliation conditions"). The sequential order indicates the order in which the attribute lists are taken out of the generated reconciliation condition storage table 132 by the reconciliation judging unit 114 (explained later). Like the attribute lists in the existing reconciliation condition storage table 131, the attribute lists store therein properties of the CIs. In particular, unlike the existing reconciliation condition storage table 131, each of the attribute lists in the generated reconciliation condition storage table 132 may store therein not only a single property but also a set made up of a plurality of properties. Further, each of the attribute lists in the generated reconciliation condition storage table 132 may also specify a property (e.g., the host name, the domain name) of which the value can be shared by two or more targets. Each of the IDs is an identification number assigned for identifying a different one of the generated reconciliation conditions.

For example, the generated reconciliation condition to which an ID "id2_1" is assigned indicates that the attribute list "IP address, host name, domain name" is taken out from the generated reconciliation condition storage table 132 first. Further, the generated reconciliation condition to which an ID "id2_2" is assigned indicates that the attribute list "host name, domain name" is taken out from the generated reconciliation condition storage table 132, subsequent to the generated reconciliation condition to which the ID "id2_1" is assigned. Further, the generated reconciliation condition to which an ID "id2_3" is assigned indicates that the attribute list "host name" is taken out from the generated reconciliation condition storage table 132, subsequent to the generated reconciliation condition to which the ID "id2_2" is assigned. Further, the generated reconciliation condition to which an ID "id2_4" is assigned indicates that the attribute list "asset register number" is taken out from the generated reconciliation condition storage table 132, subsequent to the generated reconciliation condition to which the ID "id2_3" is assigned.

As explained above, the generated reconciliation condition storage table 132 stores therein the generated integration conditions each specifying, not only one or more properties (e.g., an IP address) of which the values are unique to one target, but one or more properties that can be contained, while having identical values, in a plurality of CIs related to mutually different targets.

The controlling unit 11 controls the entirety of the information management apparatus 1. The controlling unit 11 includes an operation executing unit 111, a data managing unit 112, the reconciliation executing unit 113, the reconciliation judging unit 114, and the reconciliation condition generating unit 115. The operation executing unit 111 obtains various types of process requests via the network from the terminal device 2 used by the operator and executes operations according to the obtained process requests. For example, when having received a process request from the terminal device 2 indicating that a piece of configuration information is deleted, the operation executing unit 111 causes the data managing unit 112 to delete the piece of configuration information being a deletion target. As another example, when having received a process request from the terminal device 2 indicating that a CI is added, the operation executing unit 111 causes the data managing unit 112 to obtain a CI represented by the reconciliation target information and causes the reconciliation judging unit 114 to perform a reconciliation judging process on the CI.

In response to an instruction from the operation executing unit 111, the data managing unit 112 takes out a desired CI from the FCMDB 101 or registers a CI reconciled by the reconciliation executing unit 113 into the reconciled information storage area 121.

In response to an instruction from the operation executing unit 111, the reconciliation executing unit 113 performs a reconciliation process to reconcile a CI represented by reconciliation target information with another CI. In other words, the reconciliation executing unit 113 integrates together the CIs determined by the reconciliation judging unit 114 as CIs related to mutually the same target. More specifically, as explained above, because each of the MDRs 3a to 3d manages the configuration information independently of the others among the MDRs 3a to 3d, mutually different names or mutually different local IDs may be assigned to pieces of configuration information managed by the MDRs 3a to 3b, even if the pieces of configuration information are related to mutually the same target. For this reason, when it has become apparent that some of the CIs are related to mutually the same target, the reconciliation executing unit 113 manages these CIs as CIs of mutually the same target, by changing the names or the local IDs contained in the CIs to a name or a local ID unique to mutually the same target.

The reconciliation judging unit 114 determines a CI related to the same target as the target of the CI represented by the reconciliation target information. In the following sections, the reconciliation judging process performed by the reconciliation judging unit 114 is explained. FIGS. 6A to 6E are drawings for explaining the reconciliation judging process according to the present embodiment.

Figure 6A:
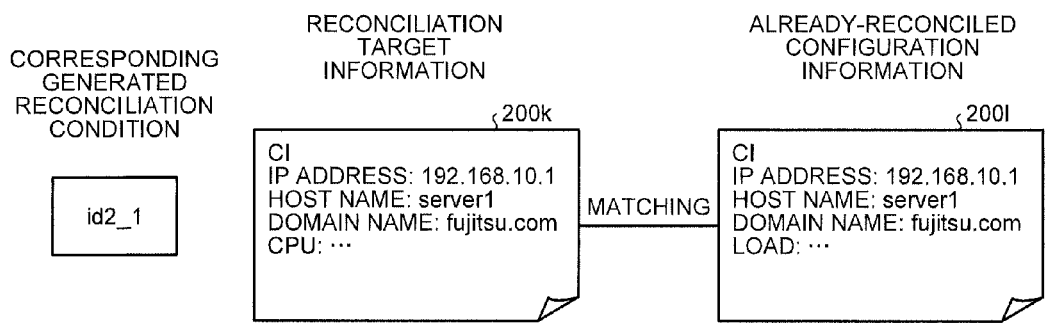
FIG. 6A is a drawing for explaining a reconciliation judging process according to the present embodiment.

For example, let us assume that the operation executing unit 111 has received a process request from the terminal device 2 indicating that a CI 200k depicted in FIG. 6A is added. The CI 200k contains the IP address "192.168.10.1", the host name "server1", the domain name "fujitsu.com", and CPU information, as properties. In this situation, in response to an instruction from the operation executing unit 111, the reconciliation judging unit 114 performs a reconciliation judging process on the CI 200k.

First, according to the order, the reconciliation judging unit 114 takes out a generated reconciliation condition corresponding to the reconciliation target information out of the generated reconciliation condition storage table 132. More specifically, from among the generated reconciliation conditions stored in the generated reconciliation condition storage table 132 depicted in FIG. 5, the reconciliation judging unit 114 takes out the generated reconciliation condition identified with the ID "id2_1" kept in correspondence with the sequential order "1".

Subsequently, the reconciliation judging unit 114 judges whether the CI 200k contains all of the properties "IP address, host name, domain name" contained in the attribute list of the generated reconciliation condition taken out. As a result of the judging process, because the CI 200k contains all of the properties "IP address, host name, domain name", the reconciliation judging unit 114 determines the generated reconciliation condition identified with the ID "id2_1" as a reconciliation condition corresponding to the CI 200k.

As explained above, the reconciliation judging unit 114 functions as a condition obtaining unit that obtains, from the generated condition storage unit, one of the generated integration conditions specifying only one or more attributes that are the same as the one or more attributes contained in the integration target information that is the information representing a target to be integrated, as a generated integration condition corresponding to the integration target information.

Further, the generated reconciliation conditions stored in the generated reconciliation condition storage table 132 are, as depicted in FIG. 5, arranged in descending order of the number of properties contained in the attribute list of each of the reconciliation conditions. More specifically, the "sequential order" numerals are assigned to the generated reconciliation conditions in descending order of the number of properties contained in each of the generated reconciliation conditions.

For example, the generated reconciliation condition identified with the ID "id2_1" contains the three properties "IP address, host name, domain name", in the attribute list. As another example, the generated reconciliation condition identified with the ID "id2_2" contains the two properties "host name, domain name", in the attribute list. As yet another example, the generated reconciliation condition identified with the ID "id2_3" contains the one property "host name", in the attribute list. As yet another example, the generated reconciliation condition identified with the ID "id2_4" contains the one property "asset register number", in the attribute list. In this situation, these generated reconciliation conditions are kept in correspondence with the sequential order numerals "1"→"2"→"3"→"4" in descending order of the number of properties contained in each of the generated reconciliation conditions, i.e., in the order of "id2_1"→"id2_2"→"id2_3"→"id2_4".

Further, the reconciliation judging unit 114 takes out the generated reconciliation conditions stored in the generated reconciliation condition storage table 132, according to the "sequential order" indicated as "1"→"2"→"3"→"4" kept in correspondence with the generated reconciliation conditions. If each of the generated reconciliation conditions taken out contains only the one or more properties contained in the reconciliation target information, the reconciliation judging unit 114 determines the generated reconciliation condition as a generated reconciliation condition corresponding to the reconciliation target information.

As explained above, the reconciliation judging unit 114 functions as the condition obtaining unit and, when taking out one of the generated reconciliation conditions from the generated reconciliation condition storage table 132, the reconciliation judging unit 114 takes out the generated reconciliation condition containing the largest number of attributes among the generated reconciliation conditions each specify only one or more attributes that are the same as the one or more attributes contained in the reconciliation target information, as the generated reconciliation condition corresponding to the reconciliation target information. More specifically, the reconciliation judging unit 114 takes out the reconciliation conditions from the generated reconciliation condition storage table 132 according to the order in which the reconciliation conditions are arranged. When each of the generated reconciliation conditions taken out contains only the one or more attributes contained in the reconciliation target information, the reconciliation judging unit 114 determines the generated reconciliation condition taken out as the generated reconciliation condition corresponding to the reconciliation target information.

Subsequently, the reconciliation judging unit 114 takes out the CIs that have already been reconciled one by one from the reconciled information storage area 121 and judges whether it is possible to reconcile the CI taken out with the reconciliation target information by using the generated reconciliation condition corresponding to the reconciliation target information. More specifically, the reconciliation judging unit 114 judges whether the values of the properties contained in the generated reconciliation condition among the properties contained in the taken-out already-reconciled CI are identical to the values of the properties contained in the generated reconciliation condition among the properties contained in the reconciliation target information.

For example, let us discuss a situation in which the reconciliation judging unit 114 has taken out a CI 200*l* from the reconciled information storage area 121 as an already-reconciled CI. The CI 200*l* contains the IP address "192.168.10.1", the host name "server1", the domain name "fujitsu.com", and load information, as properties.

In this situation, the reconciliation judging unit 114 judges whether the values of the properties "IP address, host name, domain name" contained in the attribute list of the generated reconciliation condition among the properties "IP address, host name, domain name, load" contained in the CI 200*l* are identical to the values of the properties "IP address, host name, domain name" contained in a CI 200*k*. As a result of the judging process, because the values of the properties "IP address, host name, domain name" contained in the CI 200*l* are all identical to the values of the properties "IP address, host name, domain name" contained in the CI 200*k*, the reconciliation judging unit 114 determines the CI 200*l* as configuration information related to the same target as the CI 200*k* is related to.

Figure 6B:
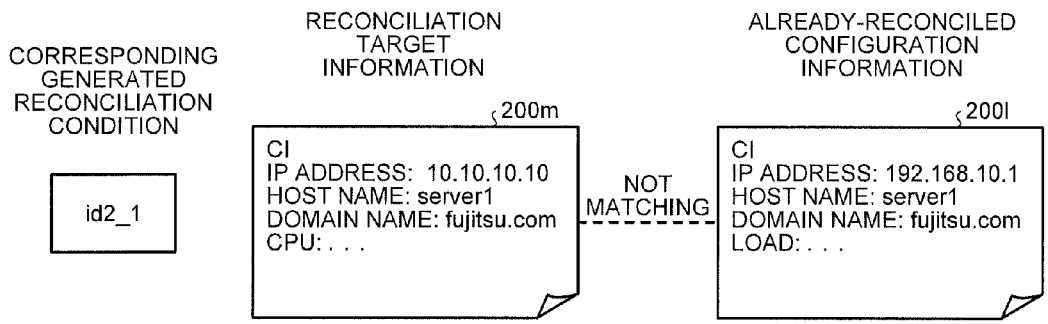
FIG. 6B is another drawing for explaining the reconciliation judging process according to the present embodiment.

Further, let us assume that the operation executing unit 111 has received a process request from the terminal device 2 indicating that a CI 200*m* depicted in FIG. 6B is added. The CI 200*m* contains an IP address "10.10.10.10.", the host name "server1", the domain name "fujitsu.com", and CPU information, as properties. In this situation, in response to an instruction from the operation executing unit 111, the reconciliation judging unit 114 performs a reconciliation judging process on the CI 200*m*.

First, the reconciliation judging unit 114 takes out a generated reconciliation condition corresponding to the reconciliation target information out of the generated reconciliation condition storage table 132. More specifically, from among the generated reconciliation conditions stored in the generated reconciliation condition storage table 132 depicted in FIG. 5, the reconciliation judging unit 114 takes out the generated reconciliation condition identified with the ID "id2_1" kept in correspondence with the sequential order "1".

Subsequently, the reconciliation judging unit 114 judges whether the CI 200*m* contains all of the properties "IP address, host name, domain name" contained in the attribute list of the generated reconciliation condition taken out. As a result of the judging process, because the CI 200*m* contains all of the properties "IP address, host name, domain name", the reconciliation judging unit 114 determines the generated reconciliation condition identified with the ID "id2_1" as a reconciliation condition corresponding to the CI 200*m*.

After that, let us assume that the reconciliation judging unit 114 has taken out the CI 200*l* from the reconciled information storage area 121 as an already-reconciled CI. In this situation, the reconciliation judging unit 114 judges whether the values of the properties "IP address, host name, domain name" contained in the attribute list of the generated reconciliation condition among the properties "IP address, host name, domain name, load" contained in the CI 200*l* are identical to the values of the properties "IP address, host name, domain name" contained in the CI 200*m*. As a result of the judging process, because the value of the IP address among the properties "IP address, host name, domain name" contained in the CI 200*l* is different from the value of the IP address contained in the CI 200*m*, the reconciliation judging unit 114 determines that the CI 200*l* and the CI 200*m* are not pieces of configuration information related to mutually the same target.

Figure 6C:
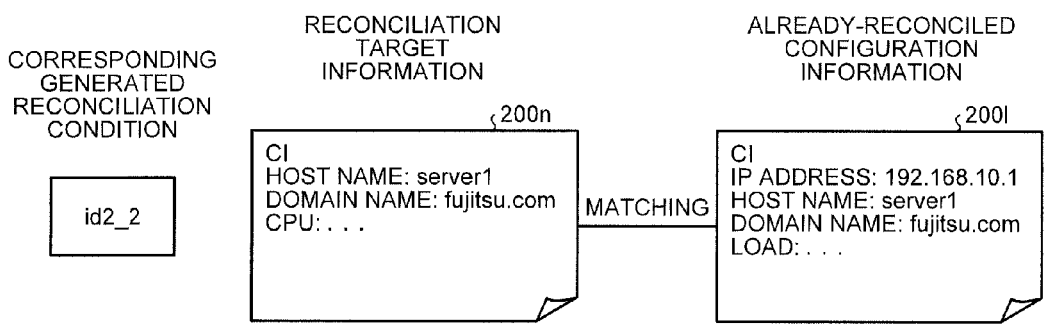
FIG. 6C is yet another drawing for explaining the reconciliation judging process according to the present embodiment.

Further, let us assume that the operation executing unit 111 has received a process request from the terminal device 2 indicating that a CI 200*n* depicted in FIG. 6C is added. The CI 200*n* contains the host name "server1", the domain name "fujitsu.com", and CPU information, as properties. In this situation, in response to an instruction from the operation executing unit 111, the reconciliation judging unit 114 performs a reconciliation judging process on the CI 200*n*.

First, the reconciliation judging unit 114 takes out a generated reconciliation condition corresponding to the reconciliation target information out of the generated reconciliation condition storage table 132. More specifically, from among the generated reconciliation conditions stored in the generated reconciliation condition storage table 132 depicted in FIG. 5, the reconciliation judging unit 114 takes out the generated reconciliation condition identified with the ID "id2_1" kept in correspondence with the sequential order "1".

Subsequently, the reconciliation judging unit 114 judges whether the CI 200*n* contains all of the properties "IP address, host name, domain name" contained in the attribute list of the generated reconciliation condition taken out. As a result of the judging process, because the CI 200*n* does not contain the property "IP address", the reconciliation judging unit 114 takes out the generated reconciliation condition identified with the ID "id2_2" kept in correspondence with the sequential order "2", from among the generated reconciliation conditions stored in the generated reconciliation condition storage table 132. Further, the reconciliation judging unit 114 judges whether the CI 200*n* contains all of the properties "host name, domain name" contained in the attribute list of the generated reconciliation condition identified with the ID "id2_2". As a result of the judging process, because the CI 200*n* contains all of the properties "host name, domain name", the reconciliation judging unit 114 determines the generated reconciliation condition identified with the ID "id2_2" as a generated reconciliation condition corresponding to the CI 200*n*.

After that, let us assume that the reconciliation judging unit 114 has taken out the CI 200*l* from the reconciled information storage area 121 as an already-reconciled CI. In this situation, the reconciliation judging unit 114 judges whether the values of the properties "host name, domain name" contained in the attribute list of the generated reconciliation condition among the properties "IP address, host name, domain name, load" contained in the CI 200*l* are identical to the values of the properties "host name, domain name" contained in the CI 200*n*. As a result of the judging process, because the values of the properties "host name, domain name" contained in the CI 200*l* are all identical to the values of the properties "host name, domain name" contained in the CI 200*n*, the reconciliation judging unit 114 determines the CI 200*l* as configuration information related to the same target as the CI 200*n* is related to.

Figure 6D:
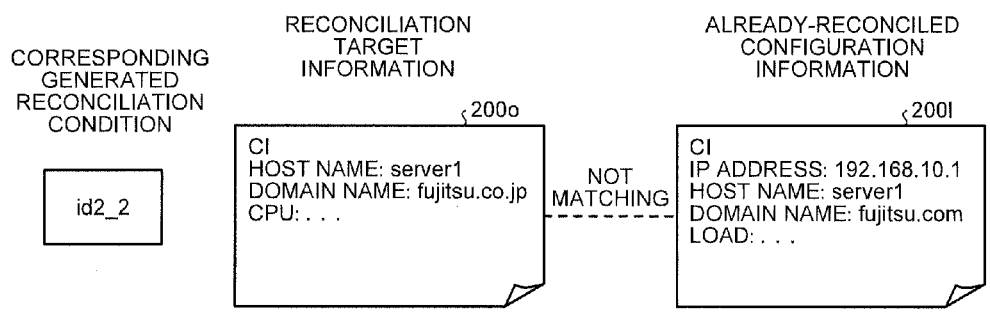
FIG. 6D is yet another drawing for explaining the reconciliation judging process according to the present embodiment.

Further, let us assume that the operation executing unit 111 has received a process request from the terminal device 2 indicating that a CI 200*o* depicted in FIG. 6D is added. The CI 200*o* contains the host name "server1", a domain name "fujitsu.co.jp", and CPU information, as properties. In this situation, in response to an instruction from the operation executing unit 111, the reconciliation judging unit 114 performs a reconciliation judging process on the CI 200*o*.

First, the reconciliation judging unit 114 takes out a generated reconciliation condition corresponding to the reconciliation target information out of the generated reconciliation condition storage table 132. More specifically, from among the generated reconciliation conditions stored in the generated reconciliation condition storage table 132 depicted in FIG. 5, the reconciliation judging unit 114 takes out the generated reconciliation condition identified with the ID "id2_1" kept in correspondence with the sequential order "1".

Subsequently, the reconciliation judging unit 114 judges whether the CI 200*o* contains all of the properties "IP address, host name, domain name" contained in the attribute list of the generated reconciliation condition taken out. As a result of the judging process, because the CI 200*o* does not contain the property "IP address", the reconciliation judging unit 114 takes out the generated reconciliation condition identified with the ID "id2_2" kept in correspondence with the sequential order "2", from among the generated reconciliation conditions stored in the generated reconciliation condition storage table 132. Further, the reconciliation judging unit 114 judges whether the CI 200*o* contains all of the properties "host name, domain name" contained in the attribute list of the generated reconciliation condition identified with the ID "id2_2". As a result of the judging process, because the CI 200*o* contains all of the properties "host name, domain name", the reconciliation judging unit 114 determines the generated reconciliation condition identified with the ID "id2_2" as a generated reconciliation condition corresponding to the CI 200*o*.

After that, let us assume that the reconciliation judging unit 114 has taken out the CI 200*l* from the reconciled information storage area 121 as an already-reconciled CI. In this situation, the reconciliation judging unit 114 judges whether the values of the properties "host name, domain name" contained in the attribute list of the generated reconciliation condition among the properties "IP address, host name, domain name, load" contained in the CI 200*l* are identical to the values of the properties "host name, domain name" contained in the CI 200*o*. As a result of the judging process, because the domain name "fujitsu.com" among the values of the properties "host name, domain name" contained in the CI 200*l* is different from the domain name "fujitsu.co.jp" contained in the CI 200*o*, the reconciliation judging unit 114 determines that the CI 200*l* and the CI 200*o* are not pieces of configuration information related to mutually the same target.

Figure 6E:
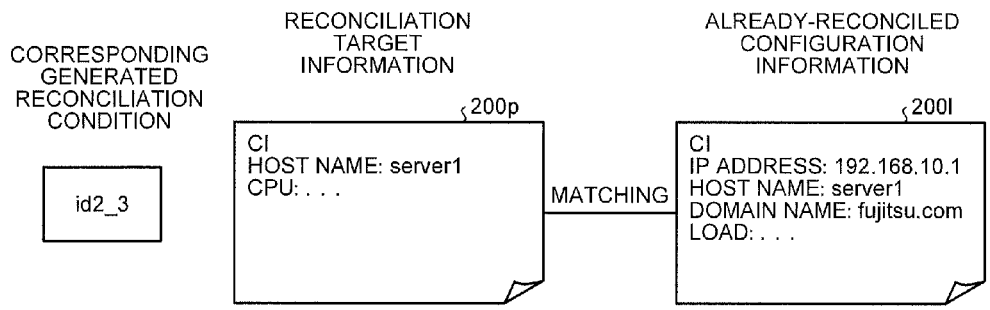
FIG. 6E is yet another drawing for explaining the reconciliation judging process according to the present embodiment.

Further, let us assume that the operation executing unit 111 has received a process request from the terminal device 2 indicating that a CI 200*p* depicted in FIG. 6E is added. The CI 200*p* contains the host name "server1" and CPU information, as properties. In this situation, in response to an instruction from the operation executing unit 111, the reconciliation judging unit 114 performs a reconciliation judging process on the CI 200*p*.

First, the reconciliation judging unit 114 takes out a generated reconciliation condition corresponding to the reconciliation target information out of the generated reconciliation condition storage table 132. More specifically, from among the generated reconciliation conditions stored in the generated reconciliation condition storage table 132 depicted in FIG. 5, the reconciliation judging unit 114 takes out the generated reconciliation condition identified with the ID "id2_1" kept in correspondence with the sequential order "1".

Subsequently, the reconciliation judging unit 114 judges whether the CI 200*p* contains all of the properties "IP address, host name, domain name" contained in the attribute list of the generated reconciliation condition taken out. As a result of the judging process, because the CI 200*p* does not contain the property "IP address", the reconciliation judging unit 114 takes out the generated reconciliation condition identified with the ID "id2_2" kept in correspondence with the sequential order "2", from among the generated reconciliation conditions stored in the generated reconciliation condition storage table 132. Further, the reconciliation judging unit 114 judges whether the CI 200*p* contains all of the properties "host name, domain name" contained in the attribute list of the generated reconciliation condition identified with the ID "id2_2". As a result of the judging process, because the CI 200*p* does not contain the property "domain name", the reconciliation judging unit 114 takes out the generated reconciliation condition identified with the ID "id2_3" kept in correspondence with the sequential order "3", from among the generated reconciliation conditions stored in the generated reconciliation condition storage table 132.

Subsequently, the reconciliation judging unit 114 judges whether the CI 200*p* contains the property "host name" contained in the attribute list of the generated reconciliation condition identified with the ID "id2_3". As a result of the judging process, because the CI 200*p* contains the property "host name", the reconciliation judging unit 114 determines the generated reconciliation condition identified with the ID "id2_3" as a generated reconciliation condition corresponding to the CI 200*p*.

After that, let us assume that the reconciliation judging unit 114 has taken out the CI 200*l* from the reconciled information storage area 121 as an already-reconciled CI. In this situation, the reconciliation judging unit 114 judges whether the value of the property "host name" contained in the attribute list of the generated reconciliation condition among the properties "IP address, host name, domain name, load" contained in the CI 200*l* is identical to the value of the property "host name" contained in the CI 200*p*. As a result of the judging process, because the value of the property "host name" contained in the CI 200*l* is identical to the value of the property "host name" contained in the CI 200*p*, the reconciliation judging unit 114 determines the CI 200*l* as configuration information related to the same target as the CI 200*p* is related to.

As explained above, the reconciliation judging unit 114 functions as a same target information judging unit that determines information that contains one or more attributes specified by the generated integration condition obtained by the generated condition obtaining unit and in which the values of the one or more attributes specified by the generated integration condition are identical to the values of the one or more attributes contained in the integration target information, as information related to the same target as the integration target information is related to.

In the present embodiment, the reconciliation judging process described above is performed if no result is obtained from a reconciliation judging process performed by using the existing reconciliation conditions stored in the existing reconciliation condition storage table 131. To perform the reconciliation judging process by using the existing reconciliation conditions, the reconciliation judging unit 114 first takes out existing reconciliation conditions corresponding to the type of CI represented by the reconciliation target information from the existing reconciliation condition storage table 131. For example, if the type of the CI represented by the reconciliation target information is "server", the reconciliation judging unit 114 takes out the existing reconciliation condition to which the ID "id1_1" is assigned, out of the existing reconciliation condition storage table 131 depicted in FIG. 4.

Further, by using the property contained in the attribute list of the existing reconciliation condition taken out, the reconciliation judging unit 114 identifies a CI related to the same target as the reconciliation target information is related to. For example, if the property contained in the attribute list of the existing reconciliation condition taken out is an "IP address", the reconciliation judging unit 114 determines such a CI that contains an identical value to the value of the IP address contained in the reconciliation target information, as a CI related to the same target as the reconciliation target information is related to.

Figure 7A:
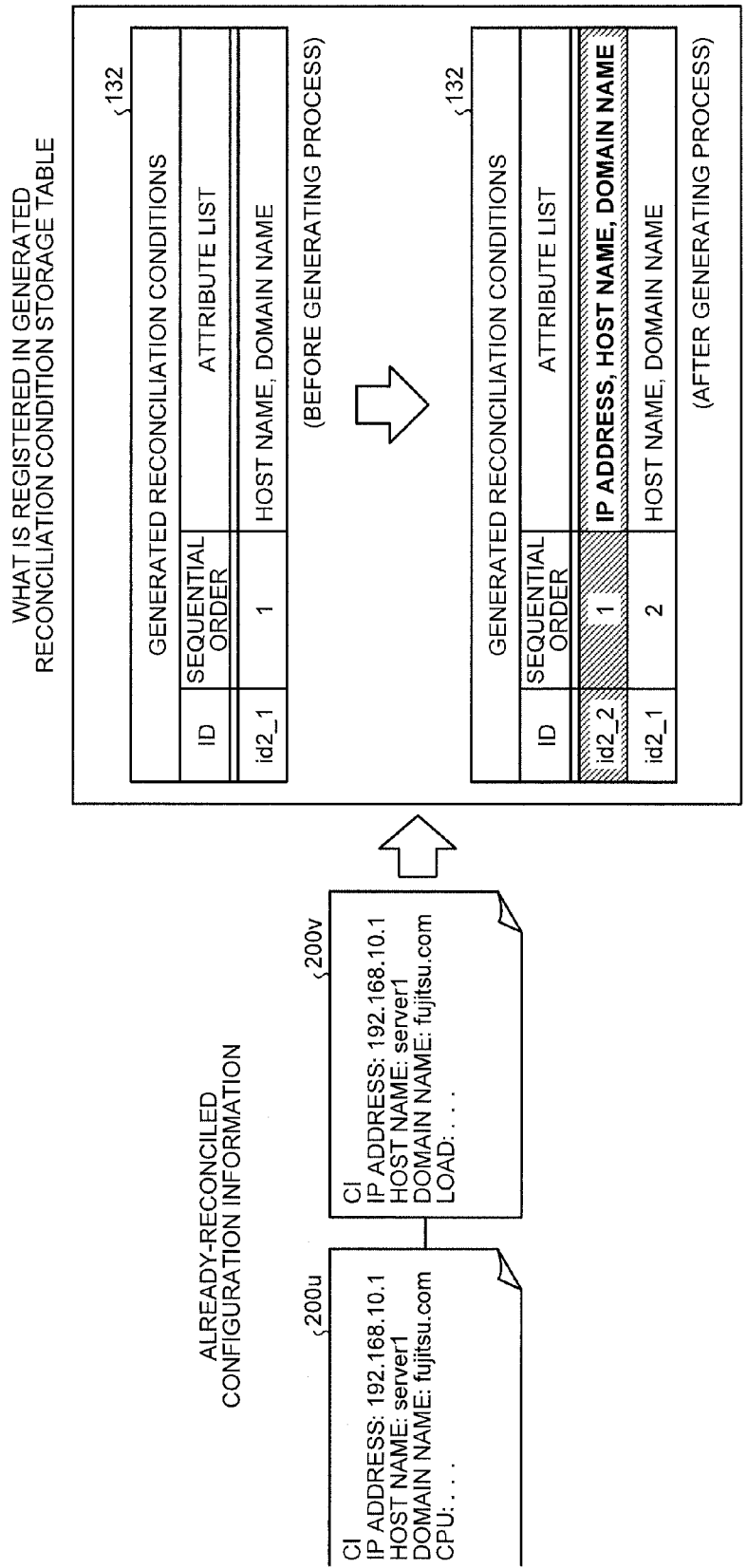
FIG. 7A is a drawing for explaining the reconciliation condition generating process according to the present embodiment.

The reconciliation condition generating unit 115 generates the generated reconciliation conditions based on a plurality of CIs. More specifically, from among the properties contained in a plurality of CIs in duplicate, the reconciliation condition generating unit 115 extracts properties having identical values as a new reconciliation condition. In the following sections, the reconciliation condition generating process performed by the reconciliation condition generating unit 115 is explained. FIGS. 7A and 7B are drawings for explaining the reconciliation condition generating process according to the present embodiment.

For example, let us assume that the operation executing unit 111 has received a process request from the terminal device 2 indicating that two CIs (i.e., CIs 200u and 200v) depicted in FIG. 7A is reconciled. The CI 200u contains the IP address "192.168.10.1", the host name "server1", the domain name "fujitsu.com", and CPU information, as properties. The CI 200v contains the IP address "192.168.10.1", the host name "server1", the domain name "fujitsu.com", and load information, as properties. In this situation, in response to an instruction from the operation executing unit 111, the reconciliation condition generating unit 115 generates a generated reconciliation condition based on the CIs 200u and 200v.

More specifically, from among the properties "IP address, host name, domain name, CPU information" contained in the CI 200u and the properties "IP address, host name, domain name, load information" contained in the CI 200v, the reconciliation condition generating unit 115 extracts the properties "IP address, host name, domain name" contained in the CIs 200u and 200v in duplicate. Further, the reconciliation condition generating unit 115 generates a reconciliation condition containing the extracted properties "IP address, host name, domain name" in the attribute list thereof and registers the reconciliation condition into the generated reconciliation condition storage table 132 as a generated reconciliation condition.

As explained above, the reconciliation condition generating unit 115 functions as a method generating unit that extracts, from a plurality of pieces of information related to mutually the same target, one or more attributes being contained, in duplicate, in the plurality of pieces of information and having identical values between the plurality of pieces of information and that registers an integration condition specified by the one or more extracted attributes into the generated condition storage unit as a generated integration condition.

Further, when registering the generated reconciliation condition into the generated reconciliation condition storage table 132, the reconciliation condition generating unit 115 registers the generated reconciliation condition into the generated reconciliation condition storage table 132 in such a manner that the generated reconciliation conditions stored in the generated reconciliation condition storage table 132 are arranged in an order according to the number of properties contained in each of the generated reconciliation conditions.

For example, let us assumed that, as depicted in FIG. 7A, a generated reconciliation condition containing two properties "host name, domain name" in the attribute list is stored in the generated reconciliation condition storage table 132, while being kept in correspondence with the sequential order "1" and the ID "id2_1". Further, let us assume that the reconciliation condition generating unit 115 is to register the reconciliation condition generated based on the CIs 200u and 200v into the generated reconciliation condition storage table 132 being in that state.

In this situation, the number of properties contained in the reconciliation condition generated based on the CIs 200u and 200v is "three", whereas the number of properties contained in the generated reconciliation condition identified with the ID "id2_1" stored in the generated reconciliation condition storage table 132 is "two". Accordingly, the reconciliation condition generating unit 115 registers the generated reconciliation condition into the generated reconciliation condition storage table 132, in such a manner that the generated reconciliation condition is arranged so as to precede the generated reconciliation condition identified with the ID "id2_1".

More specifically, the reconciliation condition generating unit 115 stores the generated reconciliation condition in correspondence with the sequential order "1" and also changes the sequential order "2" kept in correspondence with the generated reconciliation condition stored in the generated reconciliation condition storage table 132 to "1". Further, the ID "id2_2" is assigned to the generated reconciliation condition. As a result, the generated reconciliation condition identified with the ID "id2_2" containing, in the attribute list, a larger number of properties than the generated reconciliation condition identified with the ID "id2_1" will be taken out earlier, from the generated reconciliation condition storage table 132 by the reconciliation judging unit 114.

As another example, let us assume that the operation executing unit 111 has received a process request from the terminal device 2 indicating that two CIs (i.e., CIs 200w and 200x) depicted in FIG. 7B is reconciled. The CI 200w contains a host name "server2" and an asset register number, as properties. The CI 200x contains the host name "server2" and an operation status, as properties. In this situation, in response to an instruction from the operation executing unit 111, the reconciliation condition generating unit 115 generates a reconciliation condition based on the CIs 200w and 200x.

More specifically, from among the properties "host name, asset register number" contained in the CI 200w and the properties "host name, operation status" contained in the CI 200x, the reconciliation condition generating unit 115 extracts the property "host name" contained in the CIs 200w and 200x in duplicate. Further, the reconciliation condition generating unit 115 generates a reconciliation condition containing the extracted property "host name" in the attribute list thereof and registers the reconciliation condition into the generated reconciliation condition storage table 132 as a generated reconciliation condition. As depicted in FIG. 7B, in the generated reconciliation condition storage table 132, a generated reconciliation condition containing the three properties "IP address, host name, domain name" in the attribute list is stored in correspondence with the sequential order "1" and with the ID "id2_2", whereas another generated reconciliation condition containing the two properties "host name, domain name" in the attribute list is stored in correspondence with the sequential order "2" and with the ID "id2_1".

In this situation, the number of properties contained in the reconciliation condition generated based on the CIs 200$w$ and 200$x$ is "one", whereas the number of properties contained in the generated reconciliation condition identified with the ID "id2_2" stored in the generated reconciliation condition storage table 132 is "three". Further, the number of properties contained in the generated reconciliation condition identified with the ID "id2_1" stored in the generated reconciliation condition storage table 132 is "two". Accordingly, the reconciliation condition generating unit 115 registers the generated reconciliation condition into the generated reconciliation condition storage table 132 in such a manner that the generated reconciliation condition is arranged so as to be subsequent to the generated reconciliation conditions identified with the IDs "id2_1" and "id2_2".

More specifically, the reconciliation condition generating unit 115 stores the generated reconciliation condition in correspondence with the sequential order "3". As a result, the generated reconciliation condition identified with the ID "id2_3" will be taken out from the generated reconciliation condition storage table 132 by the reconciliation judging unit 114, later than the generated reconciliation condition identified with the ID "id2_1" and the generated reconciliation condition identified with the ID "id2_2".

As explained above, the reconciliation condition generating unit 115 registers the generated reconciliation condition into the generated reconciliation condition storage table 132 in such a manner that the generated reconciliation conditions stored in the generated reconciliation condition storage table 132 are arranged in an order according to the number of properties contained in each of the generated reconciliation conditions.

The reconciliation condition generating unit 115 may perform a reconciliation condition generating process not only on the plurality of CIs contained in the process request from the terminal device 2, but also on a plurality of CIs that are determined as CIs related to mutually the same target and are stored in the existing reconciliation condition storage table 131. More specifically, the reconciliation condition generating unit 115 takes out a plurality of CIs related to mutually the same target (i.e., CIs that have already been reconciled) from the generated reconciliation condition storage table 132 and performs the reconciliation condition generating process as described above.

In that situation, as for properties each having a high possibility of exhibiting identical values between CIs related to mutually different targets (e.g., the property "date of purchase"), the reconciliation condition generating unit 115 does not extract such properties even if those properties are contained in a plurality of CIs in duplicate. With this arrangement, it is possible to decrease, as quickly as possible, the situations where the reconciliation target information is reconciled with a CI related to a different target. In that situation, the information management apparatus 1 stores those properties having a high possibility of exhibiting identical values between CIs related to mutually different targets, into a predetermined storage area.

Figure 8:
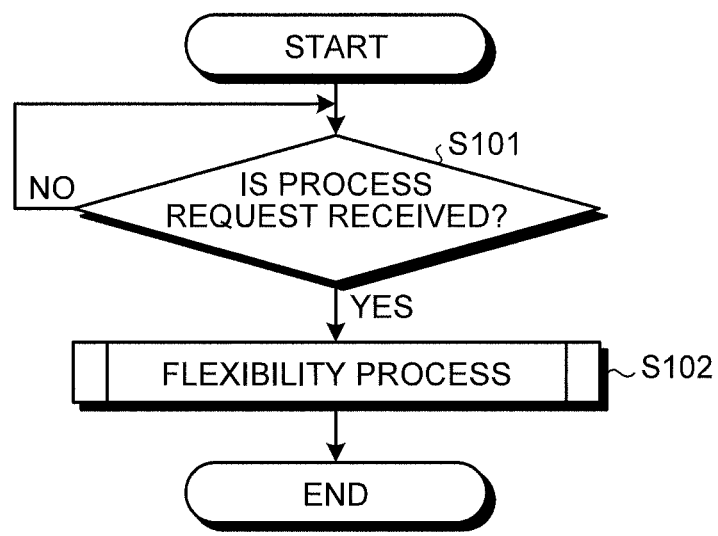
FIG. 8 is a flowchart of a processing procedure performed by the information management apparatus according to the present embodiment.

Next, a specific operation of the information management apparatus 1 according to the present embodiment is explained. FIG. 8 is a flowchart of a processing procedure performed by the information management apparatus according to the present embodiment.

As depicted in FIG. 8, first, the operation executing unit 111 judges whether a process request is received from the terminal device 2 via a network (step S101). When it is determined, as a result of the process, that a process request is received from the terminal device 2 (step S101: Yes), the controlling unit 11 performs a flexibility process (step S102). The flexibility process is a process performed according to the process request obtained from the terminal device 2 at step S101 and is explained in detail with reference to FIG. 9. When the flexibility process at step S102 is finished, the controlling unit 11 ends the process.

Figure 9:
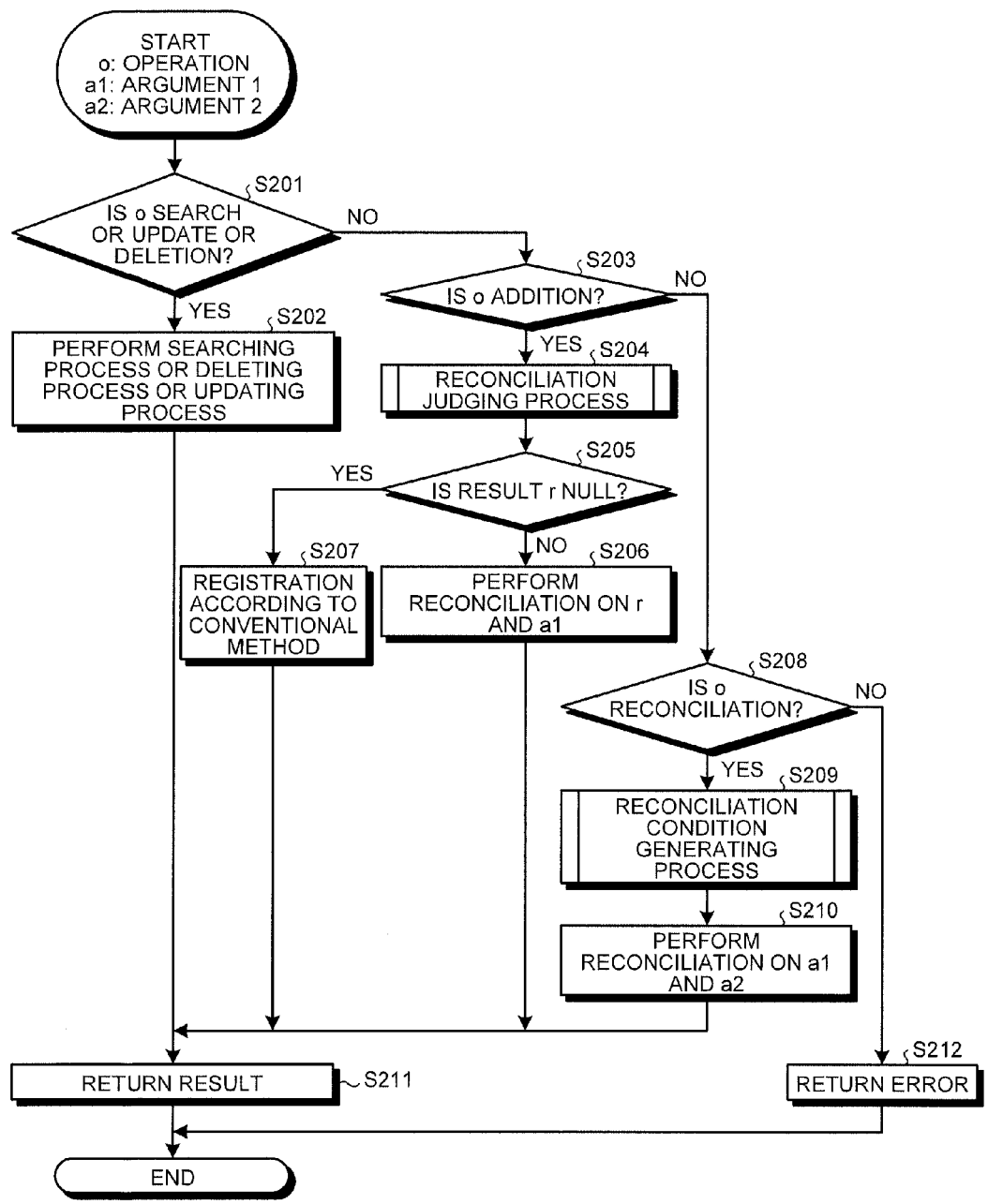
FIG. 9 is a flowchart of a processing procedure in a flexibility process according to the present embodiment.

Next, the flexibility process at step S102 is explained with reference to FIG. 9. FIG. 9 is a flowchart of a processing procedure in the flexibility process according to the present embodiment. The process request from the terminal device 2 contains, as the specifics of the request, information such as "operation" and "argument 1" or "operation", "argument 1" and "argument 2". The "operation" refers to an operation that may be executed by the information management apparatus 1 and may be, for example, "search", "update", "deletion", "addition", or "reconciliation". The "argument 1" and "argument 2" are each a piece of information for identifying the target on which the "operation" is to be performed.

For example, when the information about the "operation" contained in the process request represents a "deletion", the name or the ID of the CI which the operator desires to delete is contained in the process request as "argument 1". As another example, when the information about the "operation" contained in the process request represents a "reconciliation", the names or the IDs of the two CIs to be reconciled are contained in the process request as "argument 1" and "argument 2", respectively. Further, in the flowchart presented in FIG. 9, the information about the "operation" contained in the process request from the terminal device 2 is referred to as "o", whereas "argument 1" and "argument 2" are referred to as "a1" and "a2", respectively.

As depicted in FIG. 9, when the flexibility process is started, the operation executing unit 111 judges whether o refers to a "search", an "update", or a "deletion" (step S201). As a result of this process, if it is determined that o refers to one of "search", "update", and "deletion" (step S201: Yes), the operation executing unit 111 instructs the data managing unit 112 to perform the process of the one of "search", "update", and "deletion", so as to cause the data managing unit 112 to perform a searching process, an updating process, or a deleting process (step S202).

For example, when o refers to a "search", the process request contains, as a1, a search expression specified by the operator who is using the terminal device 2. Further, the data managing unit 112 conducts a search for the configuration information stored in the FCMDB 101, based on the search expression. As another example, when o refers to an "update", the process request contains, as a1, the name or the local ID of the configuration information being the target, as well as information after the update. The data managing unit 112 updates a corresponding one of the pieces of configuration information stored in the FCMDB 101, based on the information contained in the process request. As yet another example, when o refers to a "deletion", the process request contains, as a1, the name or the local ID of the configuration information being the target. The data managing unit 112 deletes a corresponding one of the pieces of configuration information stored in the FCMDB 101, based on the information contained in the process request.

On the contrary, if o does not refer to a "search", an "update", or a "deletion" at step S201 (step S201: No), the operation executing unit 111 judges whether o refers to an "addition" (step S203). The "addition" refers to, for example, an operation to perform a reconciliation process on a CI that is stored in the unprocessed information storage area 122 and has not yet been reconciled and to register the reconciled CI into the reconciled information storage area 121.

As a result of the process, if it is determined that o refers to an "addition" (step S203: Yes), the controlling unit 11 performs the reconciliation judging process. The reconciliation judging process is the process presented in FIG. 10 and is explained later. When o refers to an "addition", the process request from the terminal device 2 contains, as a1, the name or the local ID of the CI represented by the reconciliation target information.

When the reconciliation judging process at step S204 is finished, the operation executing unit 111 judges whether a judgment result r of the reconciliation judging process is null, i.e., whether a CI related to the same target as the reconciliation target information is related to has been identified as a result of the reconciliation judging process (step S205). As a result of this process, if the result r is not null (step S205: No), the operation executing unit 111 instructs the reconciliation executing unit 113 to perform the process, so as to cause the reconciliation executing unit 113 to perform a reconciliation process on the CI obtained as the result r and the reconciliation target information contained in the process request as a1 (step S206).

On the contrary, if it is determined that the result r is null (step S205: Yes), the controlling unit 11 registers the reconciliation target information contained as a1 in the process request into the reconciled information storage area 121 according to a conventional method (step S207). The conventional method denotes a method by which, for example, the CI corresponding to the reconciliation target information and the CI that has already been registered in the reconciled information storage area 121 are displayed on the display device of the terminal device 2, so that the operator is prompted to judge whether these CIs are related to mutually the same target and to manually perform a reconciliation process thereon.

On the contrary, if o does not refer to an "addition" at step S203 (step S203: No), the operation executing unit 111 judges whether o refers to a "reconciliation" (step S208). The "reconciliation" denotes the process to reconcile the two CIs specified by the operator as "a1" and "a2". As a result of the process, if it is determined that o refers to a "reconciliation" (step S208: Yes), the operation executing unit 111 instructs the reconciliation condition generating unit 115 and the reconciliation executing unit 113 to perform the processes, so as to cause the reconciliation condition generating unit 115 and the reconciliation executing unit 113 to perform the reconciliation condition generating process (step S209). The reconciliation condition generating process is the process presented in FIG. 12 and is explained later.

When the reconciliation condition generating process at step S209 is finished, a reconciliation process is performed on a1 and a2 (step S210). When the process at step S202, S206, S207, or S210 is finished, the operation executing unit 111 returns the result of the process at step S202, S206, S207, or S210 to the terminal device 2 via the network (step S211). On the contrary, if o does not refer to a "reconciliation" at step S208 (step S208: No), the operation executing unit 111 returns error information to the terminal device 2 via the network (step S212). When the process at step S211 or S212 is finished, the controlling unit 11 ends the flexibility process.

Figure 10:
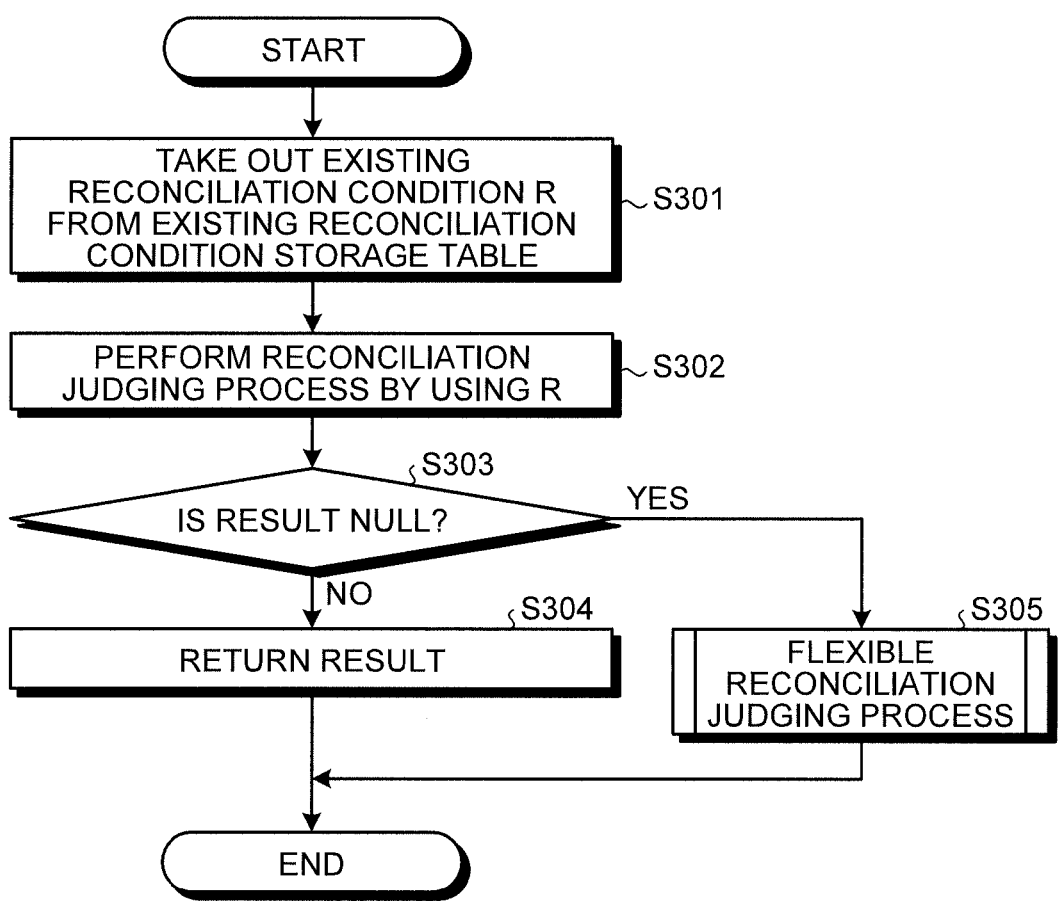
FIG. 10 is a flowchart of a processing procedure in the reconciliation judging process according to the present embodiment.

Next, the reconciliation judging process at step S204 is explained more specifically, with reference to FIG. 10. FIG. 10 is a flowchart of a processing procedure in the reconciliation judging process according to the present embodiment.

As depicted in FIG. 10, when a reconciliation judging process is started, the reconciliation judging unit 114 takes out an existing reconciliation condition from the existing reconciliation condition storage table 131 (step S301). Hereinafter, the existing reconciliation condition taken out at step S301 will be referred to as R. Subsequently, the reconciliation judging unit 114 performs a reconciliation judging process by using the existing reconciliation condition R (step S302).

After that, the reconciliation judging unit 114 judges whether the result of the reconciliation judging process performed at step S302 is null, i.e., whether a CI related to the same target as the reconciliation target information is related to has been identified as a result of the reconciliation judging process performed at step S302 (step S303). As a result of this process, if the result is not null (step S303: No), in other words, if a CI related to the same target as the reconciliation target information is related to has been identified as a result of the reconciliation judging process performed at step S302, the reconciliation judging unit 114 returns the result to the operation executing unit 111 (step S304).

On the contrary, if it is determined at step S303 that the result is null (step S303: Yes), the reconciliation judging unit 114 performs a flexible reconciliation judging process (step S305). The flexible reconciliation judging process is the process presented in FIG. 11 and will be explained later. When the process at step S304 or S305 is finished, the reconciliation judging unit 114 ends the reconciliation process.

Figure 11:
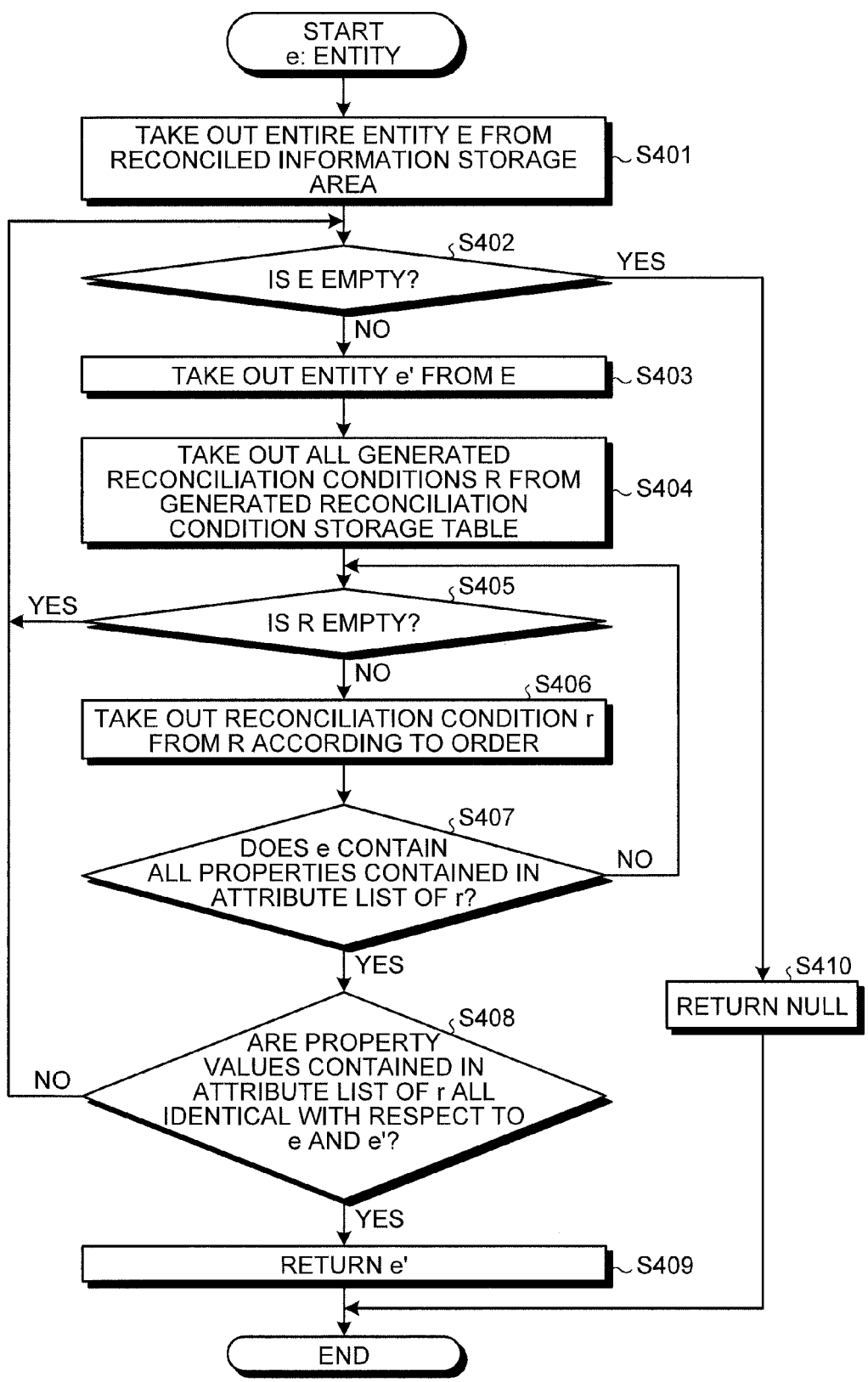
FIG. 11 is a flowchart of a processing procedure in a flexible reconciliation judging process.

Next, the flexible reconciliation judging process at step S305 is explained with reference to FIG. 11. FIG. 11 is a flowchart of a processing procedure in the flexible reconciliation judging process. In the flowchart explained below, the CI represented by the reconciliation target information will be referred to as "e".

As depicted in FIG. 11, when the flexible reconciliation judging process is started, the data managing unit 112 takes out all the CIs from the reconciled information storage area 121 (step S401). Hereinafter, the CIs taken out at step S401 will be referred to as an "Entity E". Subsequently, the reconciliation judging unit 114 judges whether E is empty (step S402). In other words, the reconciliation judging unit 114 judges whether the data managing unit 112 has taken out any CIs from the reconciled information storage area 121 at step S401. As a result of this process, if the entity E is not empty (step S402: No), the reconciliation judging unit 114 causes the process to proceed to step S403.

At step S403, the reconciliation judging unit 114 takes out an Entity e' from E. In other words, the reconciliation judging unit 114 takes out one of the CIs taken out at step S401. Subsequently, the reconciliation judging unit 114 takes out all the generated reconciliation conditions from the generated reconciliation condition storage table 132 (step S404). Hereinafter, all the generated reconciliation conditions taken out at step S404 will be referred to as "R".

After that, the reconciliation judging unit 114 judges whether R is empty (step S405). In other words, the reconciliation judging unit 114 judges whether the generated reconciliation conditions taken out at step S404 represent empty data, i.e., whether no generated reconciliation condition is stored in the generated reconciliation condition storage table 132.

As a result of the process, if R is not empty (step S405: No), the reconciliation judging unit 114 takes out one of the generated reconciliation conditions from R, according to the order (step S406). More specifically, the reconciliation judging unit 114 sequentially takes out the generated reconciliation conditions from the generated reconciliation condition storage table 132, starting with the generated reconciliation condition kept in correspondence with the sequential order "1". Accordingly, the reconciliation judging unit 114 sequentially takes out the generated reconciliation conditions from the generated reconciliation condition storage table 132, starting with the generated reconciliation condition containing the largest number of properties. Hereinafter, the one generated reconciliation condition taken out from R will be referred to as "r".

After that, the reconciliation judging unit 114 judges whether e contains all of the properties contained in the attribute list of r (step S407). In other words, the reconciliation judging unit 114 judges whether the CI represented by the reconciliation target information contains all of the properties contained in the attribute list of the generated reconciliation condition taken out at step S406. As a result of this process, if e does not contain a part or any of the properties contained in the attribute list of r (step S407: No), the reconciliation judging unit 114 causes the process to proceed to step S405.

On the contrary, if it is determined that e contains all of the properties contained in the attribute list of r (step S407: Yes), the reconciliation judging unit 114 causes the process to proceed to step S408. As explained here, as the reconciliation condition corresponding to the reconciliation target information, the reconciliation judging unit 114 obtains, from the generated reconciliation condition storage table 132, the reconciliation condition specifying only the one or more properties that are the same as the one or more properties contained in the reconciliation target information.

Also, as the generated reconciliation condition corresponding to the reconciliation target information, the reconciliation judging unit 114 obtains, from the generated reconciliation condition storage table 132, the generated reconciliation condition containing the largest number of properties, from among the generated reconciliation conditions each specifying only the one or more attributes that are the same as the one or more properties contained in the reconciliation target information, as the generated reconciliation condition corresponding to the reconciliation target information.

At step S408, the reconciliation judging unit 114 judges whether all the property values contained in the attribute list of r are identical, with respect to e and e'. In other words, the reconciliation judging unit 114 judges whether the values of the properties contained in the generated reconciliation condition taken out at step S406 among the properties contained in the CI represented by the reconciliation target information are identical to the values of the properties contained in the generated reconciliation condition taken out at step S406 among the properties contained in the one CI taken out at step S403. As a result of this process, if the values of the properties contained in the attribute list of r are not identical, with respect to e and e' (step S408: No) or it is determined that R is empty at step S405 (step S405: Yes), the reconciliation judging unit 114 causes the process to proceed to step S402.

On the contrary, at step S408, if the values of the properties contained in the attribute list of r are all identical, with respect to e and e' (step S408: Yes), the reconciliation judging unit 114 returns e' to the operation executing unit 111 as a judgment result (step S409). In other words, if the values of the properties specified by the reconciliation condition taken out at step S406 among the properties contained in the CI taken out at step S403 are identical to the values of the properties contained in the reconciliation target information, the reconciliation judging unit 114 determines the CI as a CI related to the same target as the reconciliation target information is related to and returns the CI to the operation executing unit 111 as a judgment result.

On the contrary, if it is determined that E is empty at step S402 (step S402: Yes), the reconciliation judging unit 114 returns a judgment result "null" to the operation executing unit 111 (step S410). When the process at step S409 or S410 is finished, the reconciliation judging unit 114 ends the flexible reconciliation judging process.

As explained above, the reconciliation judging unit 114 first performs the reconciliation judging process by using the existing reconciliation conditions each specifying only one or more properties of which the values are unique to one target. Further, if the reconciliation judging unit 114 was not able to identify any CI related to the same target as the reconciliation target information is related to, as a result of the reconciliation judging process, the reconciliation judging unit 114 obtains the generated integration condition corresponding to the integration target information from among the generated reconciliation conditions each specifying, not only one or more properties that are unique to one target, but one or more properties that can be contained, while having identical values, in a plurality of CIs related to mutually different targets. Further, the reconciliation judging unit 114 performs the reconciliation judging process by using the obtained generated reconciliation condition. With these arrangements, even if the reconciliation target information does not contain any property unique to a target (e.g., an IP address, an asset register number) or even if the reconciliation target information contains one or more properties unique to a target, but the reconciled information storage area 121 does not store therein any other CI containing the one or more properties in common, it is possible to identify a IC related to the same target as the reconciliation target information is related to, by performing the reconciliation judging process while using the generated reconciliation conditions each specifying, for example, a set made up of properties that are not unique to a target.

Figure 12:
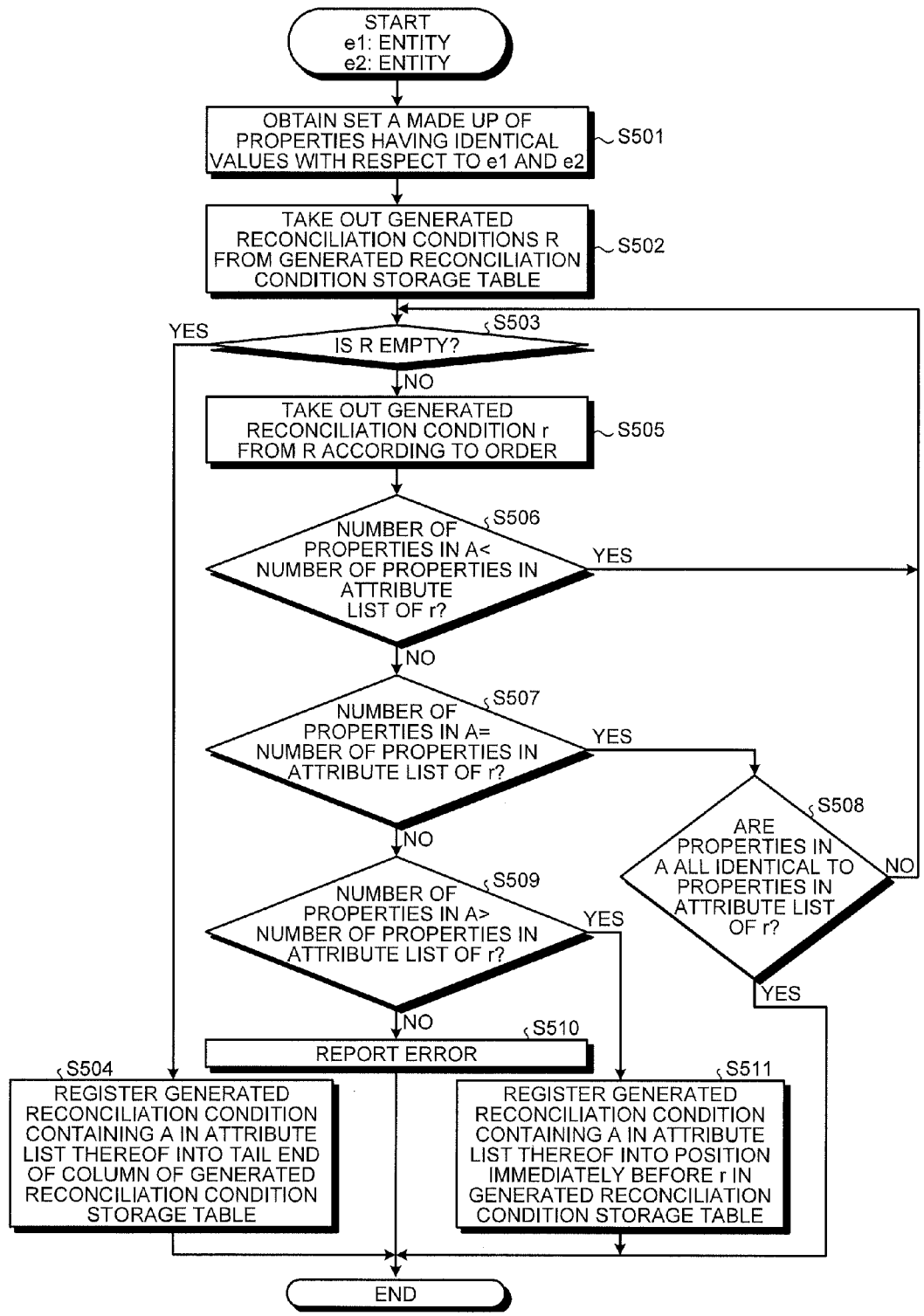
FIG. 12 is a flowchart of a processing procedure in the reconciliation condition generating process according to the present embodiment.

Next, the reconciliation condition generating process at step S209 is explained, with reference to the drawings. FIG. 12 is a flowchart of a processing procedure in the reconciliation condition generating process according to the present embodiment. In the description of the flowchart below, the two CIs being the target of the reconciliation process will be referred to as "e1" and "e2". According to the present embodiment, "e1" and "e2" are respectively identified by an argument 1 and an argument 2 contained in a process request from the terminal device 2. For example, the argument 1 contains a name or a local ID of "e1", whereas the argument 2 contains a name or a local ID of "e2".

As depicted in FIG. 12, the reconciliation condition generating unit 115 calculates a set A made up of properties having identical values with respect to e1 and e2 (step S501). For example, on the assumption that e1 is the CI 200u, whereas e2 is the CI 200v depicted in FIG. 7A, the reconciliation condition generating unit 115 obtains, from among the properties contained in the CIs 200u and 200v in common, the set made up of the properties "IP address, host name, domain name" having the identical values as the set A.

After that, the reconciliation condition generating unit 115 takes out all the generated reconciliation conditions from the generated reconciliation condition storage table 132 (step S502). Hereinafter, the set of generated reconciliation conditions taken out at step S502 will be referred to as R. After that, the reconciliation condition generating unit 115 judges whether R is empty (step S503).

As a result of this process, if it is determined that R is empty (step S503: Yes), in other words, if no generated reconciliation condition is registered in the generated reconciliation condition storage table 132, the reconciliation condition generating unit 115 registers a generated reconciliation condition containing A in the attribute list thereof into the tail end of the columns of the generated reconciliation condition storage table 132 (step S504). More specifically, when the set A represents "IP address, host name, domain name", the reconciliation condition generating unit 115 registers a generated reconciliation condition containing "IP address, host name, domain name" in the attribute list thereof into the generated reconciliation condition storage table 132, in correspondence with the sequential order "1" and a predetermined ID.

On the contrary, if R is not empty at step S503 (step S503: No), the reconciliation condition generating unit 115 takes out one of the generated reconciliation conditions from R according to the order (step S505). In other words, the reconciliation condition generating unit 115 sequentially takes out the generated reconciliation conditions, starting with the generated reconciliation condition kept in correspondence with the sequential order "1". Hereinafter, the generated reconciliation condition taken out at step S505 will be referred to as r.

Subsequently, the reconciliation condition generating unit 115 judges whether the number of properties contained in A is smaller than the number of properties contained in the attribute list of r (step S506). As a result of this process, if the reconciliation condition generating unit 115 determines that the number of properties contained in A is smaller than the number of properties contained in the attribute list of r (step S506: Yes), the reconciliation condition generating unit 115 causes the process to proceed to step S503. For example, let us assume that one property "host name" is contained in A, whereas three properties "IP address, host name, domain name" are contained in the attribute list of the generated reconciliation condition r taken out at step S505. In that situation, the reconciliation condition generating unit 115 determines that the number of properties contained in A is smaller than the number of properties contained in the attribute list of r and causes the process to proceed to step S503.

On the contrary, if the number of properties contained in A is not smaller than the number of properties contained in the attribute list of r (step S506: No), the reconciliation condition generating unit 115 judges whether the number of properties contained in A is equal to the number of properties contained in the attribute list of r (step S507). As a result of this process, if the reconciliation condition generating unit 115 determines that the number of properties contained in A is equal to the number of properties contained in the attribute list of r (step S507: Yes), the reconciliation condition generating unit 115 causes the process to proceed to step S508.

For example, let us assume that two properties "host name, domain name" are contained in A, whereas two properties "host name, domain name" are contained in the attribute list of the generated reconciliation condition r taken out at step S505. In that situation, the reconciliation condition generating unit 115 determines that the number of properties contained in A is equal to the number of properties contained in the attribute list of r and causes the process to proceed to step S508.

At step S508, the reconciliation condition generating unit 115 judges whether the properties contained in A are all identical to the properties contained in the attribute list of r. As a result of this process, if the properties contained in A are not identical to the properties contained in the attribute list of r (step S508: No), the reconciliation condition generating unit 115 causes the process to proceed to step S503. For example, let us assume that two properties "host name, domain name" are contained in A, whereas the properties "IP address, host name" are contained in the attribute list of r. In that situation, because the properties contained in A are not identical to the properties in the attribute list of r, the reconciliation condition generating unit 115 causes the process to proceed to step S503.

On the contrary, at step S507, if the number of properties contained in A is not equal to the number of properties contained in the attribute list of r (step S507: No), the reconciliation condition generating unit 115 judges whether the number of properties contained in A is larger than the number of properties contained in the attribute list of r (step S509). As a result of this process, if the number of properties contained in A is not larger than the number of properties contained in the attribute list of r (step S509: No), the reconciliation condition generating unit 115 reports an error to the operation executing unit 111 (step S510).

On the contrary, if the reconciliation condition generating unit 115 determines that the number of properties contained in A is larger than the number of properties contained in the attribute list of r (step S509: Yes), the reconciliation condition generating unit 115 registers a generated reconciliation condition containing A in the attribute list thereof into a position immediately preceding r in the generated reconciliation condition storage table 132 (step S511). For example, let us assume that three properties "IP address, host name, domain name" are contained in A, whereas two properties "host name, domain name" are contained in the attribute list of the generated reconciliation condition r taken out at step S505. In that situation, the reconciliation condition generating unit 115 registers a generated reconciliation condition containing the properties "IP address, host name, domain name" in the attribute list thereof into a position immediately preceding the column of the generated reconciliation condition containing the properties "host name, domain name" in the attribute list thereof. More specifically, if the generated reconciliation condition r containing the properties "host name, domain name" in the attribute list thereof has been stored in the generated reconciliation condition storage table 132 while being kept in correspondence with the sequential order "2", the reconciliation condition generating unit 115 changes the sequential order kept in correspondence with the generated reconciliation condition to "3" and stores the generated reconciliation condition containing the properties "IP address, host name, domain name" in the attribute list thereof into the generated reconciliation condition storage table 132 in correspondence with the sequential order "2".

When the process at step S504, S510, or S511 is finished, or when the reconciliation condition generating unit 115 determines at step S508 that the properties contained in A are all identical to the properties contained in the attribute list of r (step S508: Yes), the reconciliation condition generating unit 115 ends the reconciliation condition generating process.

As explained above, according to the present embodiment, the reconciliation condition is changed depending on how the attributes contained in the reconciliation target information match. With this arrangement, even if such a property that is unique to a target is not contained in common, it is possible to identify a CI related to the same target as the reconciliation target information is related to. As a result, it is possible to easily reconcile the CIs that are related to mutually the same target.

Moreover, as for a reconciliation condition corresponding to the reconciliation target information, according to the present embodiment, from among the generated reconciliation conditions each specifying only one or more properties that are the same as the one or more properties contained in the reconciliation target information, the generated reconciliation condition containing the largest number of properties is determined as the generated reconciliation condition corresponding to the reconciliation target information. With this arrangement, even if the attribute list contains such a property that is not unique to a target, it is possible to reconcile a CI with another CI related to the same target with higher certainty, by using the generated reconciliation condition specifying a set made up of a larger number of properties in the reconciliation judging process.

Also, according to the present embodiment, one or more properties that are contained in a plurality of CIs in duplicate and of which the values are identical between the plurality of CIs are extracted so that a reconciliation condition specified by the one or more extracted properties is registered into the generated reconciliation condition storage table 132. In other words, by generating the reconciliation condition while using a plurality of CIs that have already been reconciled or a plurality of CIs determined by the operator as CIs related to mutually the same target, it is possible to generate a reconciliation condition having a high reliability and it is therefore possible to perform a more flexible reconciliation judging process.

Furthermore, according to the present embodiment, the generated reconciliation conditions are registered in such a manner that the reconciliation conditions stored in the generated reconciliation condition storage table 132 are arranged in an order according to the number of properties contained in each of the reconciliation conditions. With this arrangement, when taking out the generated reconciliation conditions from the generated reconciliation condition storage table 132, the reconciliation judging unit 114 is able to take out the generated reconciliation conditions in descending order of the number of properties contained in each of the attribute lists by taking out the generated reconciliation conditions according to the "sequential order" kept in correspondence with the generated reconciliation conditions, without the need to, for example, compare the number of properties contained in each of the generated reconciliation conditions. It is therefore possible to improve the efficiency of the processes.

Figure 13:
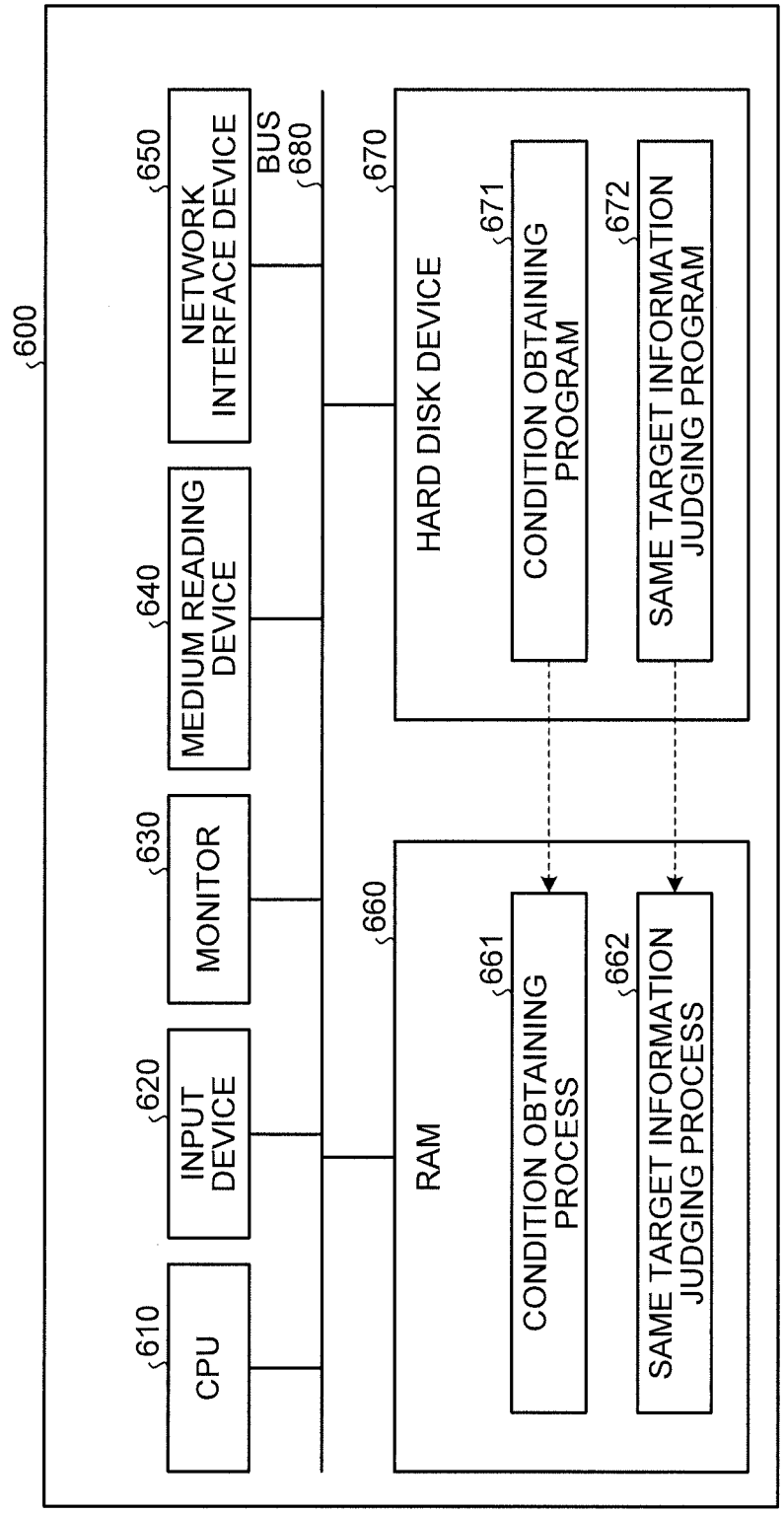
FIG. 13 is a diagram of a computer that executes an information management program.
Figure 14:
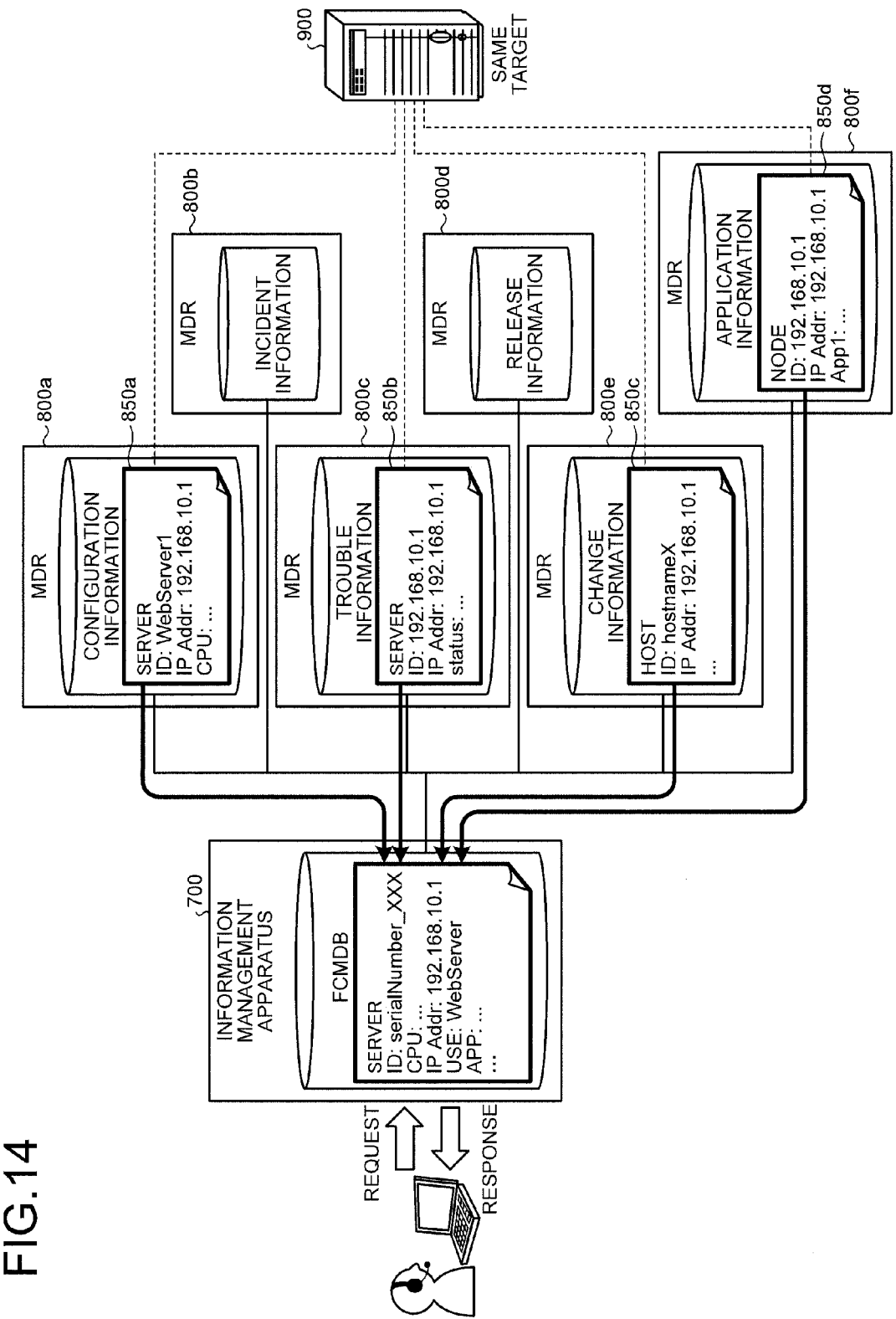
FIG. 14 is a drawing for explaining a manner in which a conventional information management apparatus integrates pieces of configuration information that are related to mutually the same target and are managed while being distributed in a plurality of Management Data Repositories (MDRs)
Figure 15:
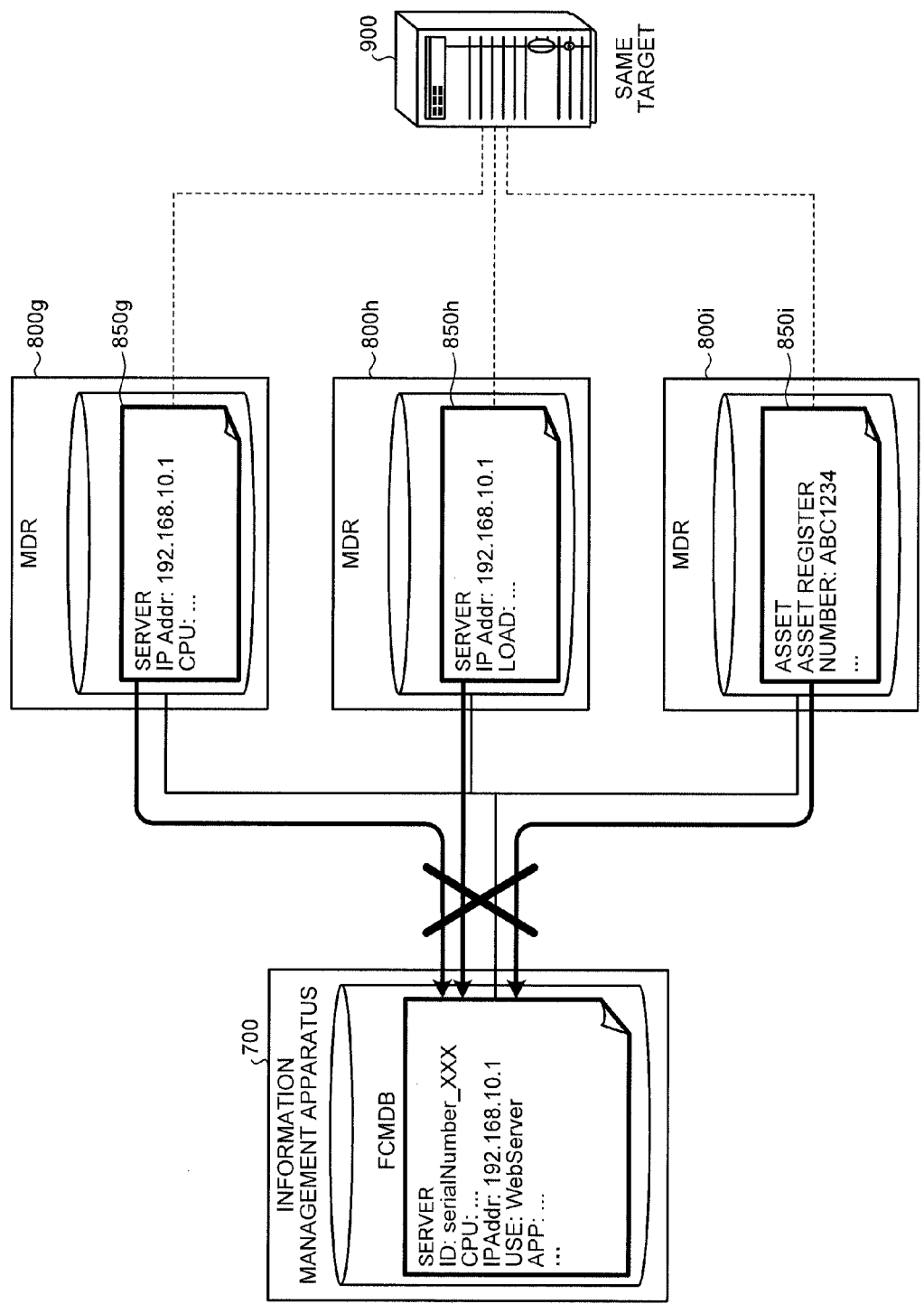
FIG. 15 is a drawing for explaining a situation in which it is not possible to reconcile pieces of configuration information related to mutually the same target because the pieces of configuration information contain no collation-purpose property.

It is also possible to realize a function equivalent to that of the information management apparatus 1 by implementing the function of the information management apparatus 1 as software and causing a computer to execute the software. Next, an example of a computer that executes an information management computer program (hereinafter, "information management program") implementing the function of the information management apparatus 1 as software is explained. FIG. 13 is a diagram of the computer that executes the information management program.

A computer 600 includes: a Central Processing Unit (CPU) 610 that executes various types of computation processes; an input device 620 that receives an input of data from a user; and a monitor 630 that displays various types of information. The computer 600 also includes: a medium reading device 640 that reads programs and the like from a recording medium; and a network interface device 650 that gives and receives data to and from another computer via a network. Further, the computer 600 includes: a Random Access Memory (RAM) 660 that temporarily stores therein various types of information; and a hard disk device 670. The computer 600 has these functional elements connected to one another by a bus 680.

Further, the hard disk device 670 has stored therein the information management program achieving the same function as the function described in the exemplary embodiments above, i.e., a condition obtaining program 671 and a same target information judging program 672.

Further, when the CPU 610 reads the condition obtaining program 671 and the same target information judging program 672 from the hard disk device 670 and loads the read programs into the RAM 660, the programs 671 and 672 function as a condition obtaining process 661 and a same target information judging process 662, respectively.

The condition obtaining program 671 and the same target information judging program 672 described above do not necessarily have to be stored in the hard disk device 670. Another arrangement is acceptable in which these programs stored in a storage medium such as a Compact Disk Read-Only Memory (CD-ROM) are read and executed by the computer 600. Alternatively, yet another arrangement is acceptable in which these programs are stored in another computer or a server connected to the computer 600 via a public line, the Internet, a Local Area Network (LAN), a Wide Area Network (WAN), or the like, so that the computer 600 reads the programs and executes the read programs.

According to an aspect of the information management apparatus and the information management program disclosed in the present application, an advantageous effect is achieved where it is possible to easily integrate the plurality of pieces of information related to mutually the same target, even if the pieces of information do not contain, in common, an attribute unique to one target.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information management apparatus comprising:
   a memory that stores therein generated integration conditions each specifying one or more attributes contained, in duplicate, in a plurality of pieces of information related to a mutually same target; and
   a processor coupled to the memory, wherein the processor executes a process comprising:

specifying only one or more attributes that are same as one or more attributes contained in integration target information that is information representing a target to be integrated;

obtaining, from the memory, an integration condition as an integration condition corresponding to the integration target information whose attributes are identical to all attributes specified by the specifying;

extracting, from a plurality of pieces of information related to mutually the same target, one or more attributes being contained, in duplicate, in the plurality of pieces of information and having identical values between the plurality of pieces of information and that registers an integration condition specified by the one or more extracted attributes into the memory, as a generated integration condition; and determining information that contains the all attributes specified by the generated integration condition obtained by the obtaining and in which values of the one or more attributes specified by the generated integration condition from among one or more attributes contained in the information are identical to the values of the one or more attributes specified by the generated integration condition from among the one or more attributes contained in the integration target information, as information related to a same target as the integration target information is related to.

2. The information management apparatus according to claim 1, wherein the processor executes the process further comprising:

storing existing integration conditions each specifying only one or more attributes of which values are unique to one target, wherein when the information related to the same target as the integration target information is related to is not identified, as a result of a judging process performed by the determining while using the existing integration conditions stored in the storing, the obtaining obtains, from the memory, the one of the generated integration conditions specifying only the one or more attributes that are the same as the one or more attributes contained in the integration target information, as the generated integration condition corresponding to the integration target information.

3. The information management apparatus according to claim 1, wherein from among generated integration conditions each specifying only the one or more attributes that are the same as the one or more attributes contained in the integration target information, the obtaining obtains, from the memory, one of the generated integration conditions containing a largest number of attributes, as the generated integration condition corresponding to the integration target information.

4. The information management apparatus according to claim 1, wherein the extracting registers the generated integration condition into the memory in such a manner that the integration conditions stored in the memory are arranged in an order according to a number of attributes contained in each of the generated integration conditions, and the obtaining takes out the one of the generated integration conditions from the memory in an order according to the order in which the generated integration conditions are arranged therein, and when the generated integration condition taken out contains only the one or more attributes contained in the integration target information, the obtaining determines the generated integration condition taken out as the generated integration condition corresponding to the integration target information.

5. The information management apparatus according to claim 1, wherein the attributes specified by the generated integration condition includes "IP address", "host name, domain name" and "host name".

6. A non-transitory computer-readable medium having recorded therein an information management program that causes a computer to perform a process, the process comprising:

specifying only one or more attributes that are same as one or more attributes contained in integration target information that is information representing a target to be integrated;

obtaining, from a generated condition storage unit storing therein generated integration conditions each specifying one or more attributes contained, in duplicate, in a plurality of pieces of information related to a mutually same target, an integration condition as an integration condition corresponding to the integration target information whose attributes are identical to all attributes specified by the specifying;

extracting, from a plurality of pieces of information related to mutually the same target, one or more attributes being contained, in duplicate, in the plurality of pieces of information and having identical values between the plurality of pieces of information and that registers an integration condition specified by the one or more extracted attributes into the memory, as a generated integration condition; and determining information that contains the one or more attributes specified by the generated integration condition obtained at the obtaining and in which values of the one or more attributes specified by the generated integration condition from among one or more attributes contained in the information are identical to the values of the one or more attributes specified by the generated integration condition from among the one or more attributes contained in the integration target information, as information related to a same target as the integration target information is related to.

* * * * *